(12) United States Patent
Morishita et al.

(10) Patent No.: US 7,880,843 B2
(45) Date of Patent: Feb. 1, 2011

(54) LIQUID CRYSTAL DISPLAY DEVICE AND VIEWING ANGLE CONTROL PANEL

(75) Inventors: Katsuhiko Morishita, Matsusaka (JP); Tsuyoshi Okazaki, Nara (JP); Takehiko Sakai, Matsusaka (JP); Yoshiharu Kataoka, Tsu (JP); Chikanori Tsukamura, Tsu (JP); Dai Chiba, Matsusaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 231 days.

(21) Appl. No.: 12/304,028

(22) PCT Filed: Mar. 22, 2007

(86) PCT No.: PCT/JP2007/055802
§ 371 (c)(1),
(2), (4) Date: Dec. 9, 2008

(87) PCT Pub. No.: WO2008/004361
PCT Pub. Date: Jan. 10, 2008

(65) Prior Publication Data
US 2010/0128200 A1    May 27, 2010

(30) Foreign Application Priority Data
Jul. 5, 2006    (JP) .............................. 2006-186087

(51) Int. Cl.
*G02F 1/1335* (2006.01)
(52) U.S. Cl. ..................................... 349/119; 349/117
(58) Field of Classification Search .......... 349/117–121
See application file for complete search history.

(56) References Cited

U.S. PATENT DOCUMENTS 5,699,137 A    12/1997    Kishimoto (Continued)

FOREIGN PATENT DOCUMENTS

EP    1 589 366    10/2005

(Continued)

OTHER PUBLICATIONS

International Search Report for PCT/JP2007/055802, mailed May 29, 2007.

(Continued)

*Primary Examiner*—Rhonda S Peace
(74) *Attorney, Agent, or Firm*—Nixon & Vanderhye, P.C.

(57) ABSTRACT

A liquid crystal display device (10) of the present invention includes a backlight (3), a display liquid crystal panel (1) and a viewing angle control panel (2) for switching a viewing angle of the display liquid crystal panel (1) between a wide viewing angle mode and a narrow viewing angle mode. The viewing angle control panel (2) includes a control panel upper polarizing plate (22), a liquid crystal cell (21) and a control panel lower polarizing plate (23) stacked in this order, and phase difference plates (24, 25) are provided between the polarizing plates (22, 23) and the liquid crystal cell (21), respectively. The viewing angle control panel (2) is arranged such that Re1 in a white display portion in the wide viewing angle mode is $n\lambda/2$ (n is an integer of 1 or more), Re2 in a white display portion in the narrow viewing angle mode is $n\lambda/2$ (n is an integer of 1 or more), and Re3 in a black display portion in the narrow viewing angle mode is $n\lambda$ (n is an integer of 1 or more).

12 Claims, 16 Drawing Sheets

U.S. PATENT DOCUMENTS

| | | |
|---|---|---|
| 2004/0252258 A1 | 12/2004 | Matsushima |
| 2005/0206814 A1 | 9/2005 | Histake |
| 2005/0243265 A1 | 11/2005 | Winlow et al. |
| 2006/0066785 A1 | 3/2006 | Moriya |
| 2006/0203320 A1 | 9/2006 | Shibazaki |

FOREIGN PATENT DOCUMENTS

| | | |
|---|---|---|
| GB | 2 413 394 | 10/2005 |
| JP | 9-101515 | 4/1997 |
| JP | 10-268251 | 10/1998 |
| JP | 11-174489 | 7/1999 |
| JP | 2003-255397 | 9/2003 |
| JP | 2006-113479 | 4/2006 |
| KR | 2006-4434 | 5/2006 |
| KR | 2006-44434 | 5/2006 |
| WO | 2004/102260 | 11/2004 |

OTHER PUBLICATIONS

Yoshimi, "Phase Difference Plate", Nitto Denko Technical Report No. 84, vol. 41, 2003.

LIQUID CRYSTAL DISPLAY DEVICE AND VIEWING ANGLE CONTROL PANEL

This application is the U.S. national phase of International Application No. PCT/JP2007/055802, filed 22 March 2007, which designated the U.S. and claims priority to Japanese Patent Application No. 2006-186087, filed 5 July 2006, the entire contents of each of which are hereby incorporated by reference.

TECHNICAL FIELD

The present invention relates to a viewing angle control panel for switching over a viewing angle of a display panel between a wide viewing angle and a narrow viewing angle and a liquid crystal display device including the viewing angle control panel.

BACKGROUND ART

Generally, a display device is required to have a viewing angle as wide as possible so that a clear image can be seen from any visual angle. Especially, in a liquid crystal display device which has been widely used in recent years, the liquid crystal itself has viewing angle dependency. Therefore, various techniques have been developed in order to increase the width of the viewing angle.

However, in some environment, there is a case where it is preferable for a display device to have a narrow viewing angle so that only a user himself can see display contents. Especially, a notebook personal computer, PDA (Personal Data Assistant) or a mobile phone and the like are likely to be used in a place, such as a train and an airplane, where a large number of people can exist. In such a place, in view of protection of secrets and privacy, it is desirable that a display device has a narrow viewing angle so that others in the vicinity of the user cannot see display contents. As described above, in recent years, there have been increasing demands for a display device which allows switching of a viewing angle of a display device between a wide viewing angle and a narrow viewing angle according to a situation in which the display device is used. It should be noted that the demands are aimed at not only a liquid crystal display device but also any display device.

In order to meet the demands, for example, Patent Document 1 discloses a technique in which a phase difference control device is provided in addition to a display device for displaying an image. The technique disclosed in Patent Document 1 enables a viewing angle characteristic to change by controlling a voltage applied to the phase difference control device. In this Patent Document 1, a chiral nematic liquid crystal, a homogeneous liquid crystal and a randomly oriented nematic liquid crystal are given as examples of a liquid crystal mode used in a phase difference control liquid crystal display device.

Further, for example, Patent Document 2 and Patent Document 3 disclose an arrangement in which a viewing angle control liquid crystal panel is provided on a display liquid crystal panel, and these panels are sandwiched by two polarizing plates. In the arrangement disclosed in the Patent Document 2 and Patent Document 3, a viewing angle is controlled by adjusting a voltage applied to the viewing angle control liquid crystal panel. In this Patent Document 2, a liquid crystal mode of the viewing angle control liquid crystal panel is a twisted nematic mode.

Further, for example, Patent Document 4 discloses a display having a liquid crystal device, between a backlight and a display device. The liquid crystal device makes it possible to switch over between a first state and a second state, the first state providing a first viewing angle, the second state providing a second viewing angle which is narrower than the first viewing angle.

[Patent Document 1]
Japanese Unexamined Patent Application Publication Tokukaihei No. 11-174489 (published on Jul. 2, 1999)
[Patent Document 2]
Japanese Unexamined Patent Application Publication Tokukaihei No. 10-268251 (published on Oct. 9, 1998)
[Patent Document 3]
Japanese Unexamined Patent Application Publication Tokukai No. 2005-309020 (published on Nov. 4, 2005)
[Patent Document 4]
Japanese Unexamined Patent Application Publication Tokukai No. 2005-316470 (published on Nov. 10, 2005)
[Non-Patent Document 1]
Nitta Denko technical report 84 (Vol. 41), pp 26-29, 2003

DISCLOSURE OF INVENTION

The conventional Patent Document 1 describes that it is possible to switch over between a wide viewing angle and a narrow viewing angle by using the phase difference control liquid crystal display device. However, this does not produce a sufficient effect. For example, as shown in FIG. 16, an equal contrast curve having a contrast ratio of 10:1 is shown in the Patent Document 1. In a narrow viewing angle mode, the contrast is surely low in a wide viewing angle direction. However, such a change cannot ensure privacy from other people.

This is because generally, even if a contrast ratio is reduced to 2:1, one can sufficiently read display contents.

Further, techniques disclosed in the Patent Documents 2 through 4 also makes it possible to switch over between a wide viewing angle and a narrow viewing angle by changing a voltage applied to a viewing angle control liquid crystal panel and adjusting a contrast. However, this does not produce a sufficient effect.

That is, all of the techniques disclosed in the Patent Documents 1 through 4 employ a technique that switching between a wide viewing angle and a narrow viewing angle is performed by reducing a contrast in a wide viewing angle direction. However, by such a technique, display contents cannot be sufficiently concealed in the wide viewing angle direction in a narrow viewing angle mode, and therefore other people can see the display contents.

The present invention was accomplished in view of the above problems. It is an object of the present invention to provide a viewing angle control panel which allows an improvement of a blocking effect and to provide a liquid crystal display device including the same.

In order to solve the above problems, a liquid crystal display device of the present invention includes a backlight, a liquid crystal display panel and a viewing angle control panel for switching a viewing angle of the liquid crystal display panel over between a first viewing angle and a second viewing angle which is within the first viewing angle and narrower than the first viewing angle, wherein: the viewing angle control panel includes a first polarizing plate, a liquid crystal layer and a second polarizing plate stacked in this order, the viewing angle control panel includes at least one phase difference plate at least one of between the first polarizing plate and the liquid crystal layer and between the second polarizing plate and the liquid crystal layer, when the viewing angle of the liquid crystal display panel is the first viewing angle, the liquid crystal display panel has a retardation value Re1 of $n\lambda/2-\lambda/4 < Re1 < n\lambda/2+\lambda/4$ (n is an integer of 1 or more) at a white display portion, when the viewing angle of the liquid crystal display panel is the second viewing angle, the liquid crystal display panel has a retardation value Re2 of $n\lambda/2-\lambda/4 < Re2 < n\lambda/2+\lambda/4$ (n is an integer of 1 or more) at a white display portion, and when the viewing angle of the liquid crystal display panel is the second viewing angle, the liquid crystal display panel has a retardation value Re3 of $n\lambda-\lambda/4 < Re3 < n\lambda+\lambda/4$ (n is an integer of 1 or more) at a black display portion.

According to the above arrangement, when the viewing angle is the second viewing angle which is narrower than the first viewing angle, it is possible to provide a liquid crystal display device having a larger blocking area (i.e. having a narrower viewing angle range which can be seen) than a conventional viewing angle control panel. This makes it possible to provide a liquid crystal display device in which display contents cannot be seen from directions except a specific direction, the liquid crystal display device having an excellent protection of privacy and security.

The "white display portion" means an area where light is not blocked and display can be seen, and the "black display portion" means an area where light is blocked and display cannot be seen. Therefore, the "white display portion" can be termed "visible area", and the "black display portion" can be termed "non-visible area". Further, the retardation value means a phase difference between individual components of light which passed through the viewing angle control panel (difference between a phase of light which moves in a delay phase axis plane and a phase of light which moves in an advance phase axis plane).

Further, in the liquid crystal display device of the present invention, it is preferable that the retardation value Re1 is $n\lambda/2$ (n is an integer of 1 or more), the retardation value Re2 is $n\lambda/2$ (n is an integer of 1 or more), and the retardation value Re3 is $n\lambda$ (n is an integer of 1 or more). According to the above arrangement, it is possible to make a viewing angle narrower in the second viewing angle.

In addition to the above arrangement, in the liquid crystal display device of the present invention, it is preferable that retardation values at a first viewpoint and a fifth viewpoint are $n\lambda/2-\lambda/4$ through $n\lambda/2+\lambda/4$ (n is an integer of 1 or more) in the second viewing angle, and retardation values at a second viewpoint, a third viewpoint and a fourth viewpoint are $n\lambda-\lambda/4$ through $n\lambda+\lambda/4$ (n is an integer of 1 or more), where the second viewpoint is a viewpoint which satisfies $\theta=90°$ and $\Phi=45°$, the third viewpoint is a viewpoint which satisfies $\theta=180°$ and $\Phi=45°$, the fourth viewpoint is a viewpoint which satisfies $\theta=270°$ and $\Phi=45°$, and the fifth viewpoint is a viewpoint from a direction of $\Phi=0°$, and where a polar angle $\Phi$ is an angle formed between a straight line drawn from a center of a surface of the viewing angle control panel to a viewpoint and a normal at the center of the surface of the viewing angle control panel, a first viewpoint is a viewpoint which satisfies $\Phi=45'$, and an azimuth $\theta$ is a rotation angle from a line drawn between a foot of a perpendicular line drawn from the first viewpoint to a plane including the surface of the viewing angle control panel and the center of the surface of the viewing angle control panel.

According to the above arrangement, when a viewing angle is the second viewing angle, display can be seen only from the first viewpoint and the fifth viewpoint among the five viewpoints, and the display cannot be seen from the other three viewpoints. Therefore, it is possible to surely prevent viewing from the vicinity of the second through fourth viewpoints.

In addition to the above arrangement, in the liquid crystal display device of the present invention, it is preferable that the phase difference plate is provided at each of between the first polarizing plate and the liquid crystal layer and between the second polarizing plate and the liquid crystal layer.

According to the above arrangement, right, left and downward directions (azimuth $\theta$ shown in FIG. 3 is 90° through 270°) of the display panel can be made the black display in the second viewing angle. Therefore, it is possible to more surely prevent viewing from these directions.

In addition to the above arrangement, in the liquid crystal display device of the present invention, it is preferable that the plurality of phase difference plates are stacked at least one of between the first polarizing plate and the liquid crystal layer, and between the second polarizing plate and the liquid crystal layer, the phase difference plates stacked on each other preferably having different refractive indexes.

According to the above arrangement, it is possible to easily form a viewing angle control panel having the retardation value described above by using an existing phase difference plate.

In addition to the above arrangement, in the liquid crystal display device of the present invention, it is preferable that the phase difference plate is selected from the group consisting of a $\lambda/4$ plate, a negative C plate, and a two-axis phase difference plate having three main refractive indexes nx, ny and nz in x-axis, y-axis and z-axis directions, the x-axis, y-axis and z-axis crossing each other at right angles, and the refractive indexes nx, ny and nz satisfying $nx > nz > ny$ and $(nx-nz)/|nx-ny|=0.1$.

The negative C plate has a relationship of $nx=ny>nz$ when having three main refractive indexes nx, ny and nz in x-axis, y-axis and z-axis directions, the x-axis, y-axis and z-axis crossing each other at right angles.

According to the above arrangement, it is possible to more surely form a phase difference plate having the retardation value described above.

In addition to the above arrangement, in the liquid crystal display device of the present invention, it is preferable that at least the $\lambda/4$ plate and the negative C plate are provided, as the phase difference plate, at least one of between the first polarizing plate and the liquid crystal layer, and between the second polarizing plate and the liquid crystal layer.

According to the above arrangement, it is possible to obtain a phase difference plate having the retardation value described above and to obtain a better narrow viewing angle characteristic.

In addition to the above arrangement, it is preferable that the liquid crystal display device of the present invention includes, as the phase difference plate, the negative C plate, the $\lambda/4$ plate and the two-axis phase difference plate, and at least one of between the first polarizing plate and the liquid crystal layer, and between the second polarizing plate and the liquid crystal layer, the negative C plate, the $\lambda/4$ plate and the two-axis phase difference plate are stacked in this order from the liquid crystal layer side.

According to the above arrangement, it is possible to obtain a phase difference plate having the retardation value described above and to obtain a better narrow viewing angle characteristic.

In addition to the above arrangement, in the liquid crystal display device of the present invention, it is preferable that polarizing transmission axes of the first polarizing plate and second polarizing plate constituting the viewing angle control panel cross each other at right angles. That is, in the viewing angle control panel, it is preferable that the polarizing transmission axes of the two polarizing plates disposed so as to face each other via the liquid crystal layer are disposed so as to cross each other at right angles. The wording that the polarizing transmission axes cross each other at right angles also means that the polarizing transmission axes cross each other at substantially right angles. The wording that the polarizing transmission axes cross each other at substantially right angles means that the polarizing transmission axes form an angle ranging from 80° to 100°.

According to the above arrangement, it is possible to switch a viewing angle between the first viewing angle and the second viewing angle which have different viewing angle ranges.

In order to solve the above problems, a viewing angle control panel of the present invention is a viewing angle control panel (i) disposed on at least one of a back surface and a front surface of a display device for displaying an image and (ii) configured to switch a viewing angle of the display device over between a first viewing angle and a second viewing angle which is within the first viewing angle and narrower than the first viewing angle, wherein: the viewing angle control panel includes a first polarizing plate, a liquid crystal layer and a second polarizing plate stacked in this order, the viewing angle control panel includes at least one phase difference plate at least one of between the first polarizing plate and the liquid crystal layer and between the second polarizing plate and the liquid crystal layer, when the viewing angle of the display device is the first viewing angle, the display device has a retardation value Re1 of $n\lambda/2-\lambda/4<Re1<n\lambda/2+\lambda/4$ (n is an integer of 1 or more) at a white display portion, when the viewing angle of the display device is the second viewing angle, the display device has a retardation value Re2 of $n\lambda/2-\lambda/4<Re2<n\lambda/2+\lambda/4$ (n is an integer of 1 or more) at a white display portion, and when the viewing angle of the display device is the second viewing angle, the liquid crystal display panel has a retardation value Re3 of $n\lambda-\lambda/4<Re3<n\lambda+\lambda/4$ (n is an integer of 1 or more) at a black display portion.

According to the above arrangement, when the viewing angle is the second viewing angle which is narrower than the first viewing angle, it is possible to provide a liquid crystal display device having a larger blocking area (i.e. having a narrower viewing angle range which can be seen) than a conventional viewing angle control panel. By disposing the viewing angle control panel on at least one of the back surface and the front surface of the display device, it is possible to provide a liquid crystal display device in which display contents cannot be seen from directions except a specific direction, the liquid crystal display device having an excellent protection of privacy and security.

The "white display portion" means an area where light is not blocked and display can be seen, and the "black display portion" means an area where light is blocked and display cannot be seen. Therefore, the "white display portion" can be termed "visible area", and the "black display portion" can be termed "non-visible area". Further, the retardation value means a phase difference between individual components of light which passed through the viewing angle control panel (difference between a phase of light which moves in a delay phase axis plane and a phase of light which moves in an advance phase axis plane).

Further, in the liquid crystal display device of the present invention, it is preferable that the retardation value Re1 is $n\lambda/2$ (n is an integer of 1 or more), the retardation value Re2 is $n\lambda/2$ (n is an integer of 1 or more), the retardation value Re3 is $n\lambda$ (n is an integer of 1 or more).

According to the above arrangement, it is possible to make a viewing angle narrower in the second viewing angle.

In addition to the above arrangement, in the viewing angle control panel of the present invention, it is preferable that in the second viewing angle, retardation values at a first viewpoint and a fifth viewpoint are $n\lambda/2-\lambda/4$ through $n\lambda/2+\lambda/4$ (n is an integer of 1 or more), and retardation values at a second viewpoint, a third viewpoint and a fourth viewpoint are $n\lambda-\lambda/4$ through $n\lambda+\lambda/4$ (n is an integer of 1 or more), where the second viewpoint is a viewpoint which satisfies $\theta=90°$ and $\Phi=45°$, the third viewpoint is a viewpoint which satisfies $\theta=180°$ and $\Phi=45°$, the fourth viewpoint is a viewpoint which satisfies $\theta=270°$ and $\Phi=45°$, and the fifth viewpoint is a viewpoint from a direction of $\Phi=0°$, and where a polar angle $\Phi$ is an angle formed between a straight line drawn from a center of a surface of the viewing angle control panel to a viewpoint and a normal at the center of the surface of the viewing angle control panel, a first viewpoint is a viewpoint which satisfies $\Phi=45°$, and an azimuth $\theta$ is a rotation angle from a line drawn between a foot of a perpendicular line drawn from the first viewpoint to a plane including the surface of the viewing angle control panel and the center of the surface of the viewing angle control panel.

According to the above arrangement, when a viewing angle is the second viewing angle, display can be seen only from the first viewpoint and the fifth viewpoint among the five viewpoints, and the display cannot be seen from the other three viewpoints. Therefore, it is possible to surely prevent viewing from the vicinity of the second through fourth viewpoints.

Additional objects, features, and strengths of the present invention will be made clear by the description below. Further, the advantages of the present invention will be evident from the following explanation in reference to the drawings.

BRIEF DESCRIPTION OF DRAWINGS

FIG. 2 (b) is a perspective view showing an orientation of liquid crystal molecules of the viewing angle control panel of FIG. 1 in a wide viewing angle mode.

FIG. 4 (b) is a view showing a positional relationship according to a visual angle between liquid crystal molecules and polarizing transmission axes of polarizing plates.

FIG. 4 (c) is a view showing a positional relationship according to a visual angle between liquid crystal molecules and polarizing transmission axes of polarizing plates.

FIG. 8 (b) shows a refractive index ellipsoid of a phase difference plate provided on the viewing angle control panel shown in FIG. 7.

FIG. 8 (c) is a schematic view showing, as a comparative example, a refractive index ellipsoid of a phase difference plate which has been conventionally used in order to increase the width of a viewing angle of a liquid crystal display device.

FIG. 9 (b) is a schematic view showing a relationship, in the viewing angle control panel shown in FIG. 7, between polarizing transmission axes, a refractive index ellipsoid of liquid crystal molecules and an refractive index ellipsoid of a phase difference plate when viewed from the vicinity of the azimuth θ=0°.

FIG. 11 (b) is a view showing a refractive index ellipsoid of a NEZ plate constituting a phase difference plate of a viewing angle control panel.

FIG. 11 (c) is a view showing a refractive index ellipsoid of a λ/4 plate constituting a phase difference plate of a viewing angle control panel.

FIG. 11 (d) is a view showing a refractive index ellipsoid of a negative C plate constituting a phase difference plate of a viewing angle control panel.

FIG. 13 (b) is a chart showing a luminance distribution of a liquid crystal display device including the viewing angle control panel shown in FIG. 10 in a wide viewing angle mode.

FIG. 14 (b) is a cross-sectional view showing another arrangement of a viewing angle control panel of the liquid crystal display device shown in FIG. 1.

FIG. 14 (c) is a cross-sectional view showing another arrangement of a viewing angle control panel of the liquid crystal display device shown in FIG. 1.

REFERENCE NUMERALS

Figure 1:
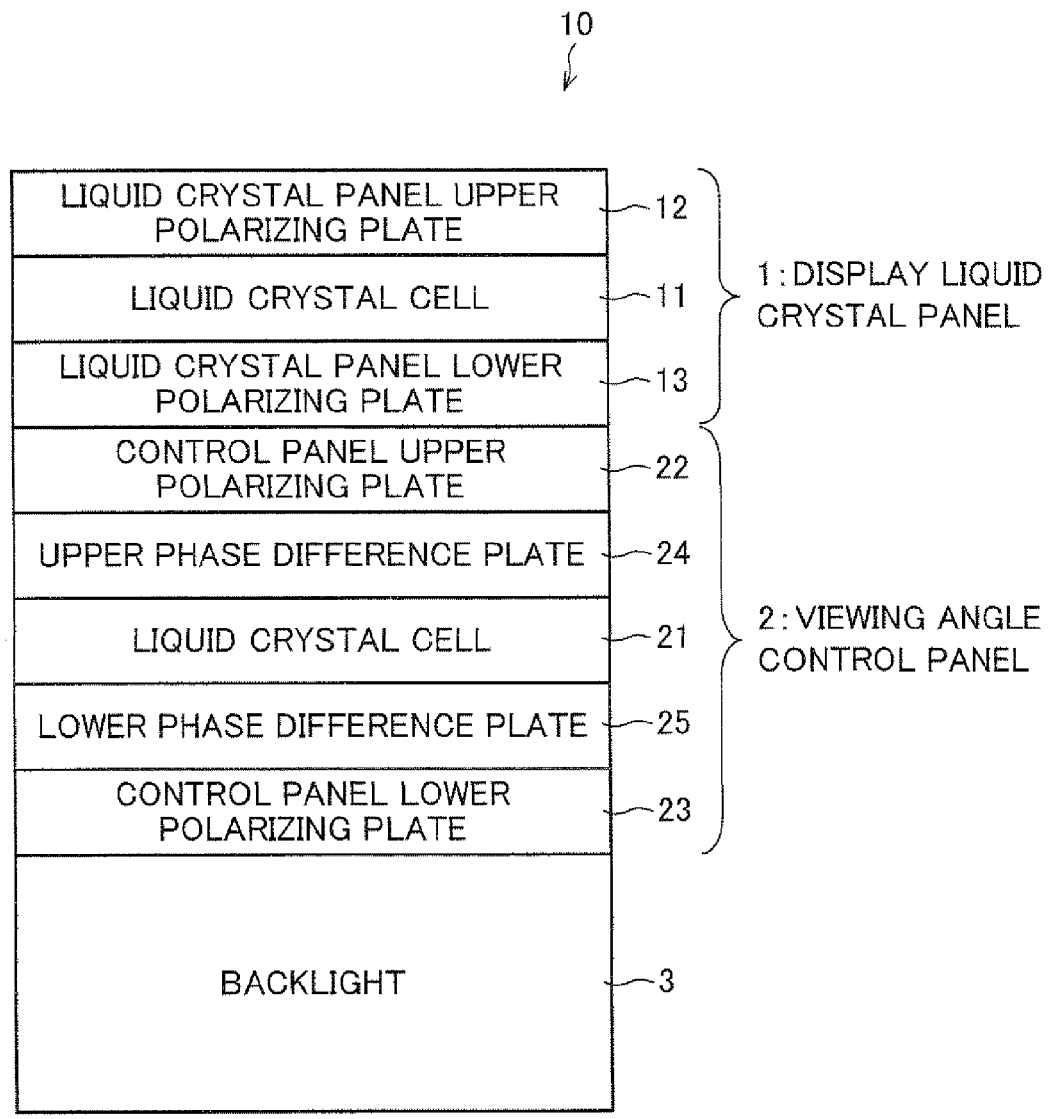
FIG. 1 shows an embodiment of a liquid crystal display device of the present invention and is a cross-sectional view showing an arrangement of the liquid crystal display device including a viewing angle control panel.

1: Display liquid crystal panel (liquid crystal display panel)
2: Viewing angle control panel
2a: Viewing angle control panel
2b: Viewing angle control panel
2c: Viewing angle control panel
3: Backlight
10: Liquid crystal display device
10a: Liquid crystal display device
11: Liquid crystal cell
12: Liquid crystal panel upper polarizing plate
13: Liquid crystal panel lower polarizing plate
21: Liquid crystal cell (liquid crystal layer)
22: Control panel upper polarizing plate (first polarizing plate)
23: Control panel lower polarizing plate (second polarizing plate)
24: Upper phase difference plate (phase difference plate)
25: Lower phase difference plate (phase difference plate)
31a: NEZ (phase difference plate)
31b: NEZ (phase difference plate)
32a: λ/4 plate (phase difference plate)
32b: λ/4 plate (phase difference plate)
33a: Negative C plate (phase difference plate)
33b: Negative C plate (phase difference plate)
$X_{22}$: Polarizing transmission axis
$X_{23}$: Polarizing transmission axis

BEST MODE FOR CARRYING OUT THE INVENTION

One embodiment of the present invention is described below with reference to FIGS. 1 through 15. It should be noted that the present invention is not limited to this.

Among constituent members of one embodiment of the present invention, only main members necessary for the explanation of the present invention are shown in the drawings for the easy explanation. Therefore, a liquid crystal display device of the present invention can include constituent members which are not shown in the drawings referred in the present specification. Further, the drawings do not illustrate the members in actual dimension and in actual dimensional ratios.

First, an arrangement of a liquid crystal display device 10 of the present embodiment is explained with reference to FIG. 1. FIG. 1 is a cross-sectional view showing an outline of an arrangement of the liquid crystal display device 10.

As shown in FIG. 1, the liquid crystal display device 10 includes two liquid crystal panels, that is, a display liquid crystal panel 1 (liquid crystal display panel) as a display panel for displaying an image, and a viewing angle control panel 2 including a liquid crystal cell 21. The display liquid crystal panel 1 is transmission-type, and a backlight 3 is used as a light source.

For example, as shown in FIG. 1, the viewing angle control panel 2 is provided between the backlight 3 and the display liquid crystal panel 1.

By performing a switching operation on liquid crystal in the viewing angle control panel 2, the liquid crystal display device 10 can switch over a display status between two modes, that is, a wide viewing angle (first viewing angle) in which an area where an image of the display liquid crystal panel 1 can be seen is wide and a narrow viewing angle (second viewing angle) in which an area where an image of the display liquid crystal panel 1 can be seen is narrow. The narrow viewing angle is suitably used when an user wants to prevent others from seeing an image of the display liquid crystal panel 1, and the wide viewing angle is suitably used when used in a normal situation except this or when more than one person see an image of the display liquid crystal panel 1.

The display liquid crystal panel 1 has liquid crystal cell 11 in which liquid crystal is sandwiched between a pair of light-transmitting substrates, and a liquid crystal panel upper polarizing plate 12 and a liquid crystal panel lower polarizing plate 13 respectively provided on a front surface and a rear surface of the liquid crystal cell 11. The liquid crystal cell 11 may have any liquid crystal mode and any cell structure. Further, the display liquid crystal panel 1 may adopt any driving mode, too. That any liquid crystal panel which can display words, images or moving pictures can be used as the display liquid crystal panel 1. Therefore, a detailed structure of the display liquid crystal panel 1 is not shown in FIG. 1, and is not explained herein.

Further, the display liquid crystal panel 1 may be a panel which can display a color image or may be a panel which can display only a monochromatic image. Further, an arrangement of the backlight 3 is not limited, and any known backlight can be used. Therefore, a detailed structure of the backlight 3 is not shown in FIG. 1, and is not explained, too.

Figure 2:
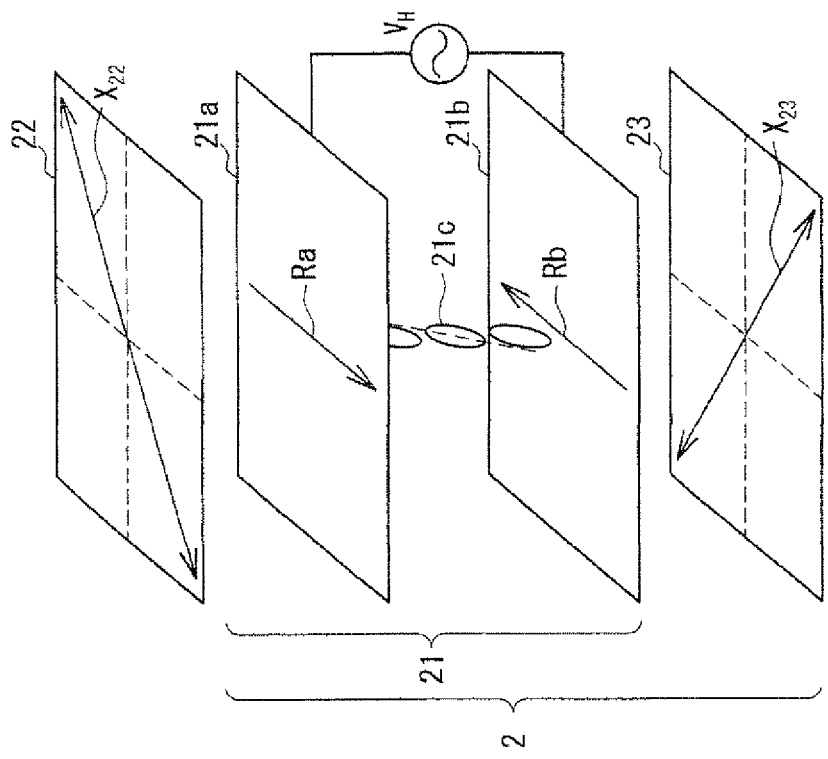
FIG. 2 (a) is a perspective view showing an orientation of liquid crystal molecules of the viewing angle control panel of FIG. 1 in a narrow viewing angle mode.
Figure 2:
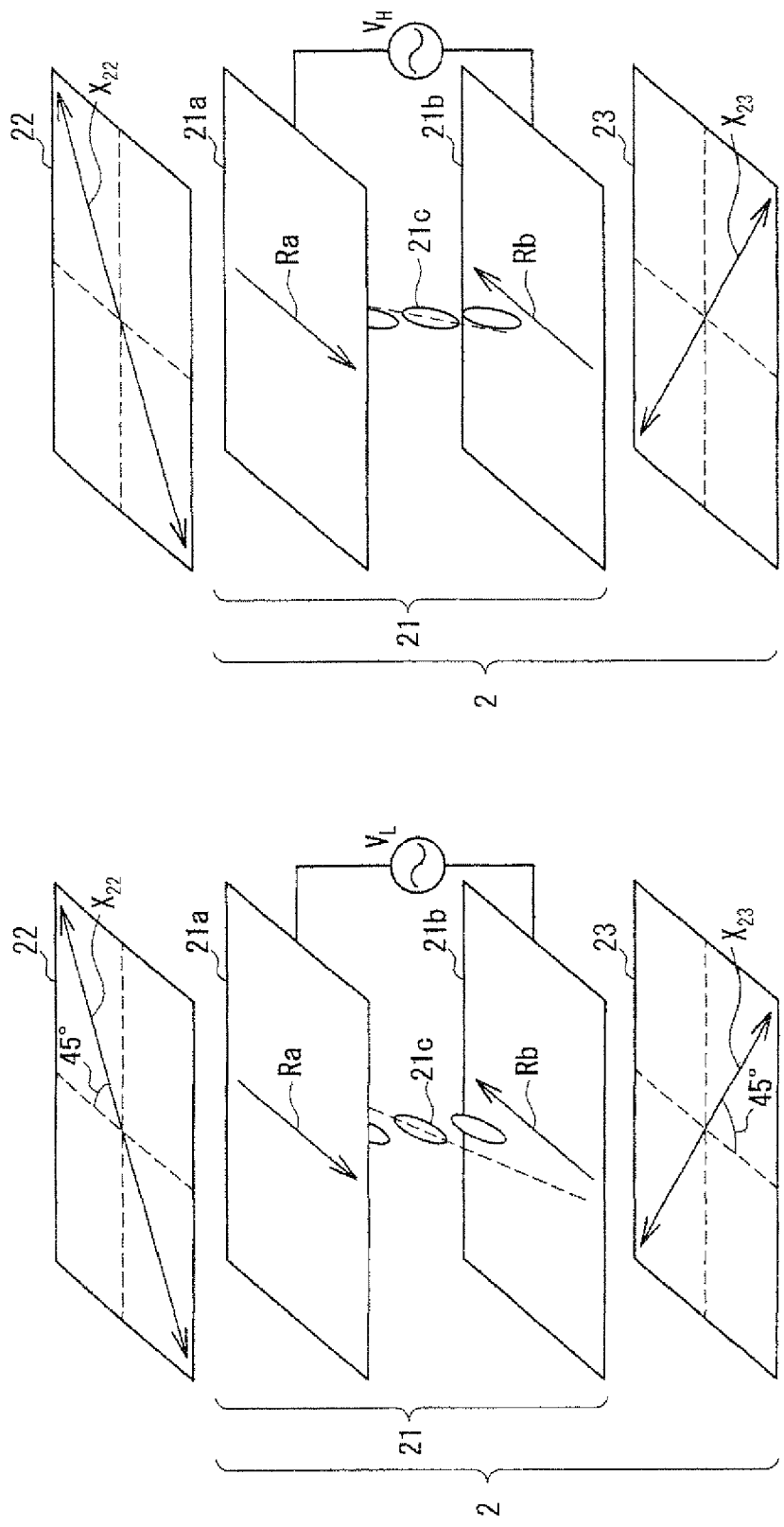

As shown in FIGS. 2 (a) and 2 (b), the viewing angle control panel 2 includes the liquid crystal cell 21 in which a liquid crystal layer is sandwiched between a pair of light-transmitting substrates 21a and 21b which are described below, two phase difference plates (upper phase difference plate 24 and lower phase difference plate 25) disposed so as to sandwich the liquid crystal cell 21, a control panel upper polarizing plate 22 (first polarizing plate) provided on top of the upper phase difference plate 24, that is, provided on a surface of the liquid crystal cell 21 nearer to the display liquid crystal panel 1, and a control panel lower polarizing plate 23 (second polarizing plate) provided on bottom of the lower phase difference plate 25, that is, provided on a surface of the liquid crystal cell 21 nearer to the backlight 3. The liquid crystal layer of the liquid crystal cell 21 is made of homogeneous aligned positive type nematic liquid crystal.

In other words, the viewing angle control panel 2 includes the control panel lower polarizing plate 23, the liquid crystal cell 21 and the control panel upper polarizing plate 22 stacked in this order, the lower phase difference plate 25 is provided between the control panel lower polarizing plate 23 and the liquid crystal cell 21, and the upper phase difference plate 24 is provided between the control panel upper polarizing plate 22 and the liquid crystal cell 21.

A surface of the control panel upper polarizing plate 22 is treated with a diffusion treatment such as an AG treatment. Further, the control panel lower polarizing plate 23 is made of a so-called clear polarizing plate on which a surface treatment is not carried out. It should be noted that the control panel upper polarizing plate 22 are not necessarily needed and can be omitted. That is, at least one polarizing plate is needed between the viewing angle control panel 2 and the display liquid crystal panel 1. Therefore, it is possible to use the liquid crystal panel lower polarizing plate 13 of the display liquid crystal panel 1 to utilize it also as the control panel upper polarizing plate 22. In this case, the liquid crystal panel lower polarizing plate 13 corresponds to the polarizing plate of the present invention.

Next, an arrangement and an operation of the viewing angle control panel 2 are explained with reference to FIGS. 2 (a) and 2 (b). It should be noted that for an easy explanation, an arrangement in which a phase difference plate is not provided on the viewing angle control panel 2 is explained first, and a more detailed structure of the phase difference plate provided on the viewing angle control panel of the present embodiment is explained later.

FIGS. 2 (a) and 2 (b) are schematic views mainly showing an arrangement of the viewing angle control panel 2, FIG. 2 (a) shows an orientation of liquid crystal molecules in a narrow viewing angle mode, and FIG. 2 (b) shows an orientation of liquid crystal molecules in a wide viewing angle mode.

As shown in FIGS. 2 (a) and 2 (b), the liquid crystal cell 21 of the viewing angle control panel 2 includes the pair of light transmitting substrates 21a and 21b. A transparent electrode (not shown) is formed on a surface of each of the light transmitting substrates 21a and 21b by using, for example, ITO (Indium Tin Oxide). It should be noted that the display liquid crystal panel 1 has an electrode structure necessary for display units because it is necessary to drive the liquid crystal on the basis of the display units such as pixel units or segment units. However, the viewing angle control panel 2 is not limited in terms of its electrode structure. For example, the viewing angle control panel 2 may be arranged such that the transparent electrode is formed uniformly on whole of the light transmitting substrates 21a and 21b in order to perform switching uniformly on whole of a display surface. Alternatively, the viewing angle control panel 2 can have a different electrode structure.

An alignment film (not shown) for aligning liquid crystal molecules 21c is formed on the transparent electrode. A rubbing treatment is carried out on the alignment film by using a known method. In FIGS. 2 (a) and 2 (b), rubbing directions in the light transmitting substrates 21a and 21b are shown by the arrows Ra and Rb, respectively. As shown in FIGS. 2 (a) and 2 (b), the rubbing direction Ra of the alignment film of the light transmitting substrate 21a is parallel to and opposite to the rubbing direction Rb of the alignment film of the light transmitting substrate 21b.

That is, the liquid crystal cell 21 is a so-called parallel type cell having a twist angle 0 (no twist). In the present embodiment, liquid crystal injected into the liquid crystal cell 21 is homogeneous aligned liquid crystal. Therefore, when a voltage is not applied, the liquid crystal molecules 21c of the liquid crystal cell 21 are oriented so that a long molecular axis is parallel to surfaces of the light transmitting substrates 21a and 21b. For example, a retardation value d·Δn (d is the thickness of the cell and Δn is a birefringent index) of the liquid crystal layer of the liquid crystal cell 21 is 350 nm through 450 nm.

When a voltage is applied across the electrodes (not shown) respectively provided on the light transmitting substrates 21a and 21b, the liquid crystal molecules 21c oriented parallel to the surfaces of the substrates change their directions gradually in accordance with the magnitude of the applied voltage in a plane, as shown in FIG. 2 (a), vertical to normal of the light transmitting substrates 21a and 21b and parallel to the rubbing directions Ra and Rb of the light transmitting substrate 21a. When the applied voltage reaches a predetermined value, the liquid crystal molecules 21c are oriented in such a manner that the long molecular axis is substantially vertical to the surfaces of the light transmitting substrates 21a and 21b, as shown in FIG. 2 (b). That is, FIG. 2 (a) shows a state where the long molecular axis of the liquid crystal molecules 21c is slightly tilted to the normal of the light transmitting substrates 21a and 21b due to the applied voltage $V_L$ (for example, a voltage of approximately 2.5V through 3.5V). Further, FIG. 2 (b) shows a state where the long molecular axis of the liquid crystal molecules 21c is substantially vertical to the surfaces of the light transmitting substrates 21a and 21b due to the applied voltage $V_H$ (for example, a voltage of 5V or more).

As shown in FIG. 2 (a), in the viewing angle control panel 2, the control panel lower polarizing plate 23 and the control panel upper polarizing plate 22 respectively provided below the liquid crystal cell 21 and above the liquid crystal cell 21 are disposed so that respective polarizing transmission axis $X_{23}$ and polarizing transmission axis $X_{22}$ cross each other at substantially the right angle.

When the polarizing transmission axis $X_{23}$ and the polarizing transmission axis $X_{22}$ cross each other at substantially the right angle (i.e. when an angle formed by the polarizing transmission axis $X_{23}$ and the polarizing transmission axis $X_{22}$ ranges from 80° to 100°), it is possible to obtain sufficient effects in viewing angle switching. The polarizing transmission axis $X_{22}$ of the control panel upper polarizing plate 22 has an inclination of 40° through 50° (preferably 45°) with respect to the rubbing direction R of the alignment film of the light transmitting substrate 21a.

Figure 3:
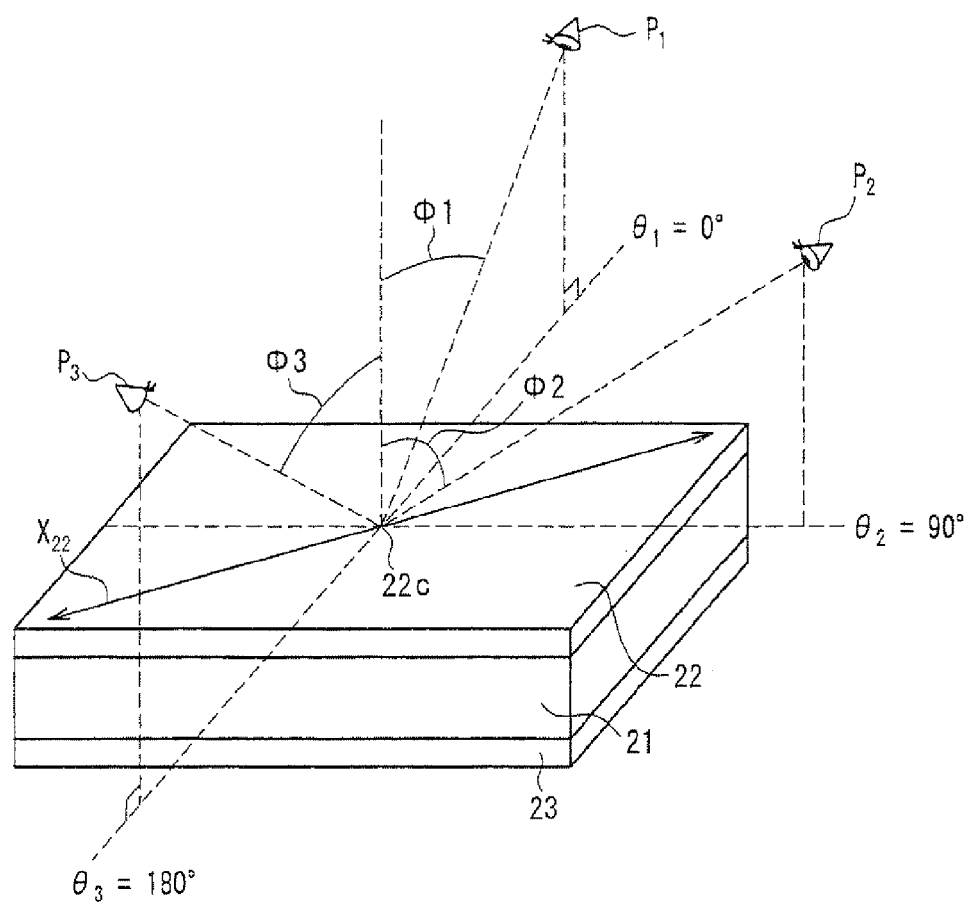
FIG. 3 is a schematic view showing a definition of a visual angle to the viewing angle control panel disposed in the same direction as in FIGS. 2 (a) and 2 (b), and explaining each viewpoint.
Figure 4:
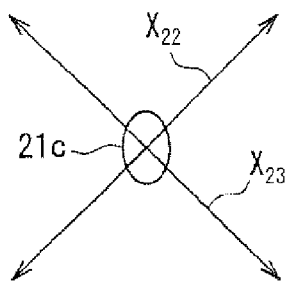
FIG. 4 (a) is a view showing a positional relationship according to a visual angle between liquid crystal molecules and polarizing transmission axes of polarizing plates.
Figure 4:
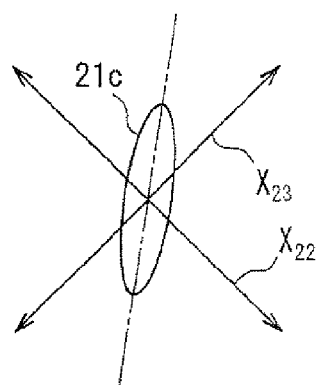
Figure 4:
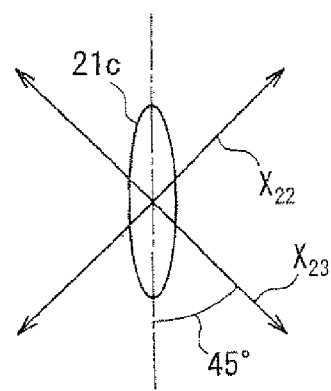

Here, a principle of switching a viewing angle over between a wide viewing angle and a narrow viewing angle is explained by using the viewing angle control panel 2 having the above arrangement with reference to FIG. 3 and FIGS. 4 (a) through 4 (c) in addition to FIGS. 2 (a) and 2 (b) described above. That is, the viewing angle control panel 2 switches a viewing angle over between a wide viewing angle and a narrow viewing angle by switching a voltage applied to the liquid crystal cell 21. It should be noted that in the following explanation, a visual angle from a viewpoint to the viewing angle control panel 2 is indicated by an azimuth θ and a polar angle Φ whose base point is the center of the control panel upper polarizing plate 22. FIG. 3 shows visual angles from three viewpoints $P_1$ through $P_3$ to the viewpoint control panel 2 arranged in the same direction as FIGS. 2 (a) and 2 (b).

As shown in FIG. 3, the azimuth θ is a rotation angle of a line linking a foot of a perpendicular line drawn from a viewpoint to a plane including the surface of the control panel upper polarizing plate 22 and the center 22c of the control panel upper polarizing plate 22. In FIG. 3, the azimuth θ is set to be 0° in a direction of viewpoint $P_1$, and increases clockwise when viewed from the upper side of the normal direction of the control panel upper polarizing plate 22. In FIG. 3, an azimuth $\theta_2$ of the viewpoint $P_2$ is 90°, and an azimuth $\theta_3$ of the viewpoint $P_3$ is 180°. The polar angle Φ is an angle formed by a straight line drawn from the center 22c of the control panel upper polarizing plate 22 to the viewpoint and the normal of the control panel upper polarizing plate 22.

The following explains a display status viewed from the viewpoints $P_1$ through $P_3$ shown in FIG. 3 with reference to FIGS. 4 (a) through 4 (c) in a case where the long molecular axis of the liquid crystal molecules 21c are slightly tilted to the normal of the light transmitting substrates 21a and 21b due to the voltage $V_L$ applied to the liquid crystal cell 21 as shown in FIG. 2 (a).

Figure 5:
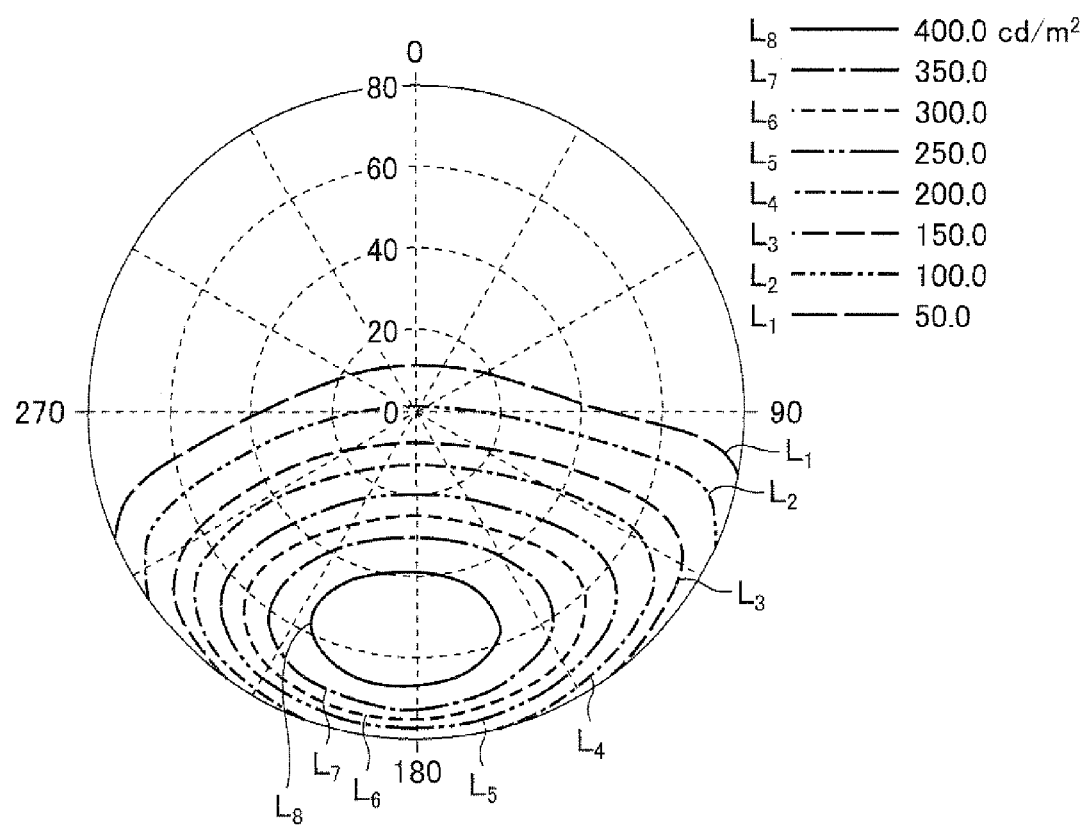
FIG. 5 is a chart showing a luminance distribution of a liquid crystal display device in a narrow viewing angle mode in a case where a phase difference plate is not provided in a viewing angle control panel.

As shown in FIG. 4 (a), as for the visual angle (azimuth $\theta_1=0°$) from the viewpoint $P_1$ shown in FIG. 3, a shorter axis side of the liquid crystal molecules 21c faces a visual angle direction. Thus, as for the visual angle from the viewpoint $P_1$, a linearly polarized light emitted from the backlight 3, transmitted through the control panel lower polarizing plate 23 and entered into the liquid crystal cell 21 is not given birefringence by the liquid crystal molecules 21c and blocked by the control panel upper polarizing plate 22. Therefore, as for the visual angle (azimuth $\theta_1=0°$) from the viewpoint $P_1$, a display becomes black. It should be noted that when the voltage $V_L$ applied to the liquid crystal cell 21 is approximately 2.5V through 3.5V as described above, it is possible to obtain a sufficient light blocking state to prevent others from peeping in a position of the azimuth $\theta_1=0°$ and in a range of the polar angle Φ, 30°≦Φ<90° as shown in FIG. 5. It should be noted that in FIG. 5, $L_1$ through $L_8$ are equipotential lines showing distribution of visual angles having luminance of 50 cd/m², 100 cd/m², 150 cd/m², 200 cd/m², 250 cd/m², 300 cd/m², 350 cd/m² and 400 cd/m².

Further, as shown in FIG. 4 (b), as for the visual angle (azimuth $\theta_2=90°$) from the viewpoint $P_2$ shown in FIG. 3, the long molecular axis of the liquid crystal molecules 21c are slightly tilted to each of the polarizing transmission axis $X_{22}$ of the control panel upper polarizing plate 22 and the control panel lower polarizing plate 23. Thus, as for the visual angle from the viewpoint $P_2$, a linearly polarized light emitted from the backlight 3, transmitted through the control panel lower polarizing plate 23 and entered into the liquid crystal cell 21 is given a small birefringence by the liquid crystal molecules 21c, but blocked by the control panel upper polarizing plate 22. Therefore, as for the visual angle (azimuth $\theta_2=90°$) from the viewpoint $P_2$, a display becomes black. Further, when viewed from a position opposite to $P_2$, that is, when the azimuth θ is 270°, a display becomes black according to the same principle as $P_2$. It should be noted that when the voltage $V_L$ applied to the liquid crystal cell 21 is approximately 2.5V through 3.5V as described above, it is possible to obtain a sufficient light blocking state to prevent others from peeping in a position of the azimuth $\theta_1=90°$ and the azimuth $\theta_1=270°$ and in a range of the polar angle Φ, 30°≦Φ<90° as shown in FIG. 5.

Further, as shown in FIG. 4 (c), as for the visual angle (azimuth $\theta_3=180°$) from the viewpoint $P_3$ shown in FIG. 3, the long molecular axis of the liquid crystal molecules 21c is tilted at 45° with respect to each of the polarizing transmission axis $X_{22}$ of the control panel upper polarizing plate 22 and the polarizing transmission axis $X_{23}$ of the control panel lower polarizing plate 23, and a longer axis side of the liquid crystal molecules 21c faces the visual angle direction. Thus, as for the visual angle from the viewpoint $P_3$, a linearly polarized light emitted from the backlight 3, transmitted through the control panel lower polarizing plate 23 and entered into the liquid crystal cell 21 is given a birefringence by the liquid crystal molecules 21c, and transmits the control panel upper polarizing plate 22 after its polarization direction is rotated so as to equal with the polarizing transmission axis $X_{22}$ of the control panel upper polarizing plate 22. Therefore, as for the visual angle from the viewpoint $P_3$, an excellent display can be obtained. It should be noted that when the applied voltage $V_L$ is approximately 2.5V through 3.5V as described above, it is possible to obtain an excellent display in a position of the azimuth $\theta_1=180°$ and in a range of the polar angle Φ, 0°≦Φ<90° as shown in FIG. 5.

As described above, when the voltage $V_L$ for tilting the long molecular axis of the liquid crystal molecules 21c by small degree from the normal of the substrate is applied to the liquid crystal cell 21 of the viewing angle control panel 2, an excellent display can be obtained only in a narrow visual angle of approximately azimuth θ=180°, and the other azimuth is black display area because the polarizing light in the liquid crystal cell 21 is blocked by the liquid crystal panel lower polarizing plate 13. Therefore, by applying the voltage $V_L$ to the liquid crystal cell 21 of the viewing angle control panel 2, it is possible to block the light emitted from the backlight 3 in a wide viewing angle direction. That is, an image displayed on the display liquid crystal panel 1 cannot be seen from the wide viewing angle direction, and the liquid crystal display device 10 can be switched into the narrow viewing angle.

Figure 6:
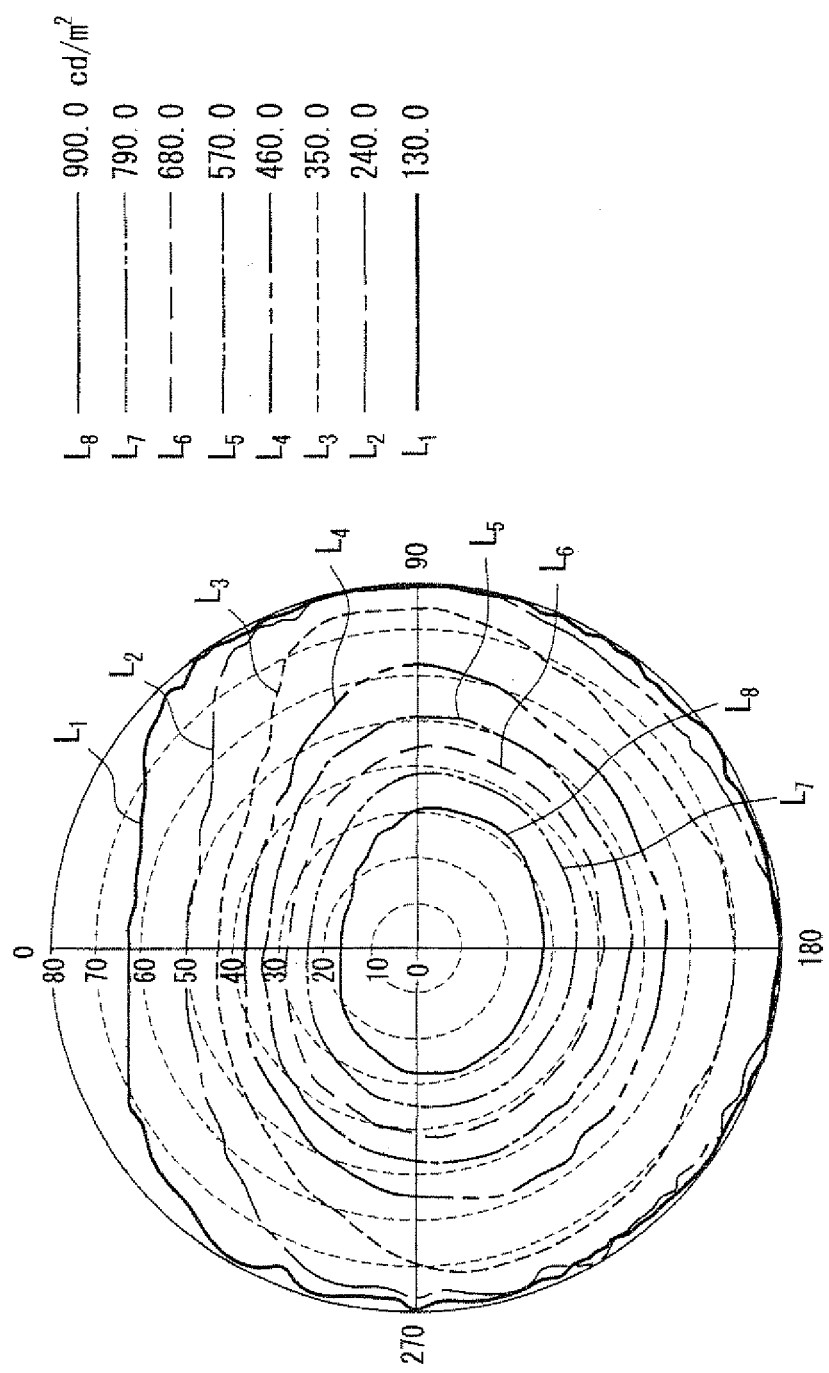
FIG. 6 is a chart showing a luminance distribution of a liquid crystal display device in a wide viewing angle mode in a case where a phase difference plate is not provided in a viewing angle control panel.

Further, when the voltage $V_H$ for tilting the long molecular axis of the liquid crystal molecules 21c substantially vertically to the substrate is applied to the liquid crystal cell 21 of the viewing angle control panel 2 as shown in FIG. 2 (b), a sufficient birefringence to obtain an excellent display in the whole azimuth θ is caused as shown in FIG. 6, and the liquid crystal display device 10 can be switched into the wide viewing angle. It should be noted that in FIG. 6, $L_1$ through $L_8$ are equipotential lines showing distribution of visual angles having luminance of 130 cd/m$^2$, 240 cd/m$^2$, 350 cd/m$^2$, 460 cd/m$^2$, 570 cd/m$^2$, 680 cd/m$^2$, 790 cd/m$^2$ and 900 cd/m$^2$.

In the liquid crystal display device 10 of the present embodiment, it is possible to switch a display status of the liquid crystal display device 10 between a wide viewing angle and a narrow viewing angle by switching a voltage applied to the liquid crystal cell 21 of the viewing angle control panel 2 between two levels of the applied voltage $V_H$ and the applied voltage $V_L$.

By the way, in recent years, there is increasing demands for expanding the blocking area in the narrow viewing angle mode in view of protection of privacy and improvement of security because the narrow viewing angle characteristic is insufficient by the luminance distribution obtained in the narrow viewing angle mode in the viewing angle control panel where a phase difference plate is not provided as shown in FIGS. 2 (a) and 2 (b).

Therefore, as shown in FIG. 1, in the viewing angle control panel 2 of the present embodiment, two phase difference plates (upper phase difference plate 24 and lower phase difference plate 25) are respectively provided between the liquid crystal cell 21 and the polarizing plate (upper polarizing plate 22 and lower polarizing plate 23). It should be noted that the present invention is not necessarily limited to this arrangement, and it is only necessary that a phase difference plate be provided at least one of between the control panel upper polarizing plate 22 and the liquid crystal cell 21 and between the control panel lower polarizing plate 23 and the liquid crystal cell 21.

Figure 7:
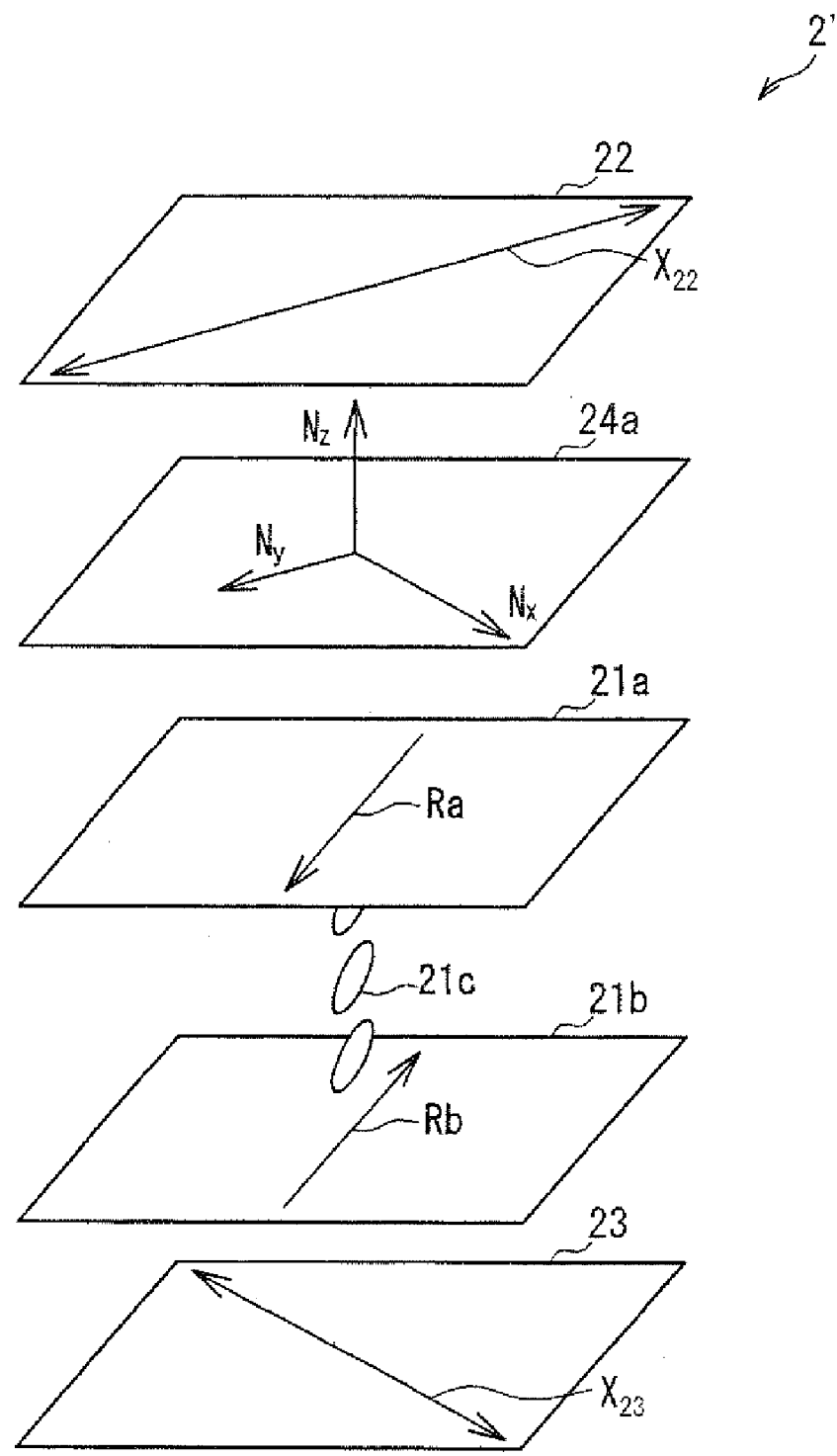
FIG. 7 is a schematic view showing an arrangement of a viewing angle control panel in a case where the viewing angle control panel has a phase difference plate.

The following explains, with reference to FIG. 7, an optical effect which is obtained by providing the phase difference plate between the polarizing plate of the control panel and the liquid crystal layer. FIG. 7 is a schematic view showing an arrangement of a viewing angle control panel 2' where one phase difference plate is provided.

As shown in FIG. 7, the viewing angle control panel 2' further includes the phase difference plate 24a between the light transmitting substrate 21a of the liquid crystal cell 21 and the control panel upper polarizing plate 22. When a display state is switched to a narrow viewing angle by applying the voltage $V_L$ to the liquid crystal cell 21, a linearly polarized light which was emitted from the backlight 3 and transmitted through the control panel lower polarizing plate 23 becomes an elliptically polarized light when viewed from a visual angle except the vicinity of the azimuth 180° shown in FIG. 3 (e.g. the vicinity of the azimuth 0°, 90° and 270°) because a birefringence is caused in the liquid crystal layer of the liquid crystal cell 21 due to a refractive index ($n_e$, $n_o$) of the liquid crystal molecules 21c. Thus, a component which transmits through the control panel upper polarizing plate 22 is generated, and light leakage is caused. The phase difference plate 24 is provided for optical compensation of the elliptically polarized light. That is, in the narrow viewing angle mode, the phase difference plate 24a is a phase difference plate which generates an elliptically polarized light which offsets an elliptically polarized light generated in the liquid crystal layer of the liquid crystal cell 21. Here, three-dimensional refractive index axes $N_X$, $N_Y$ and $N_Z$ of the phase difference plate 24a are defined as shown in FIG. 7. That is, $N_X$ is a component vertical to the polarizing transmission axis $X_{22}$ of the control panel upper polarizing plate 22, $N_Y$ is a component parallel to the polarizing transmission axis $X_{22}$ of the control panel upper polarizing plate 22, and $N_Z$ is a component parallel to the normal of the control panel upper polarizing plate 22.

Figure 8:
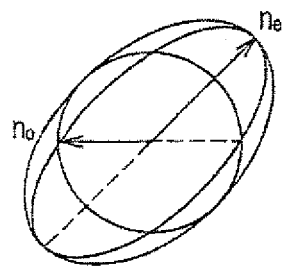
FIG. 8 (a) shows a refractive index ellipsoid of liquid crystal molecules of the viewing angle control panel shown in FIG. 7.
Figure 8:
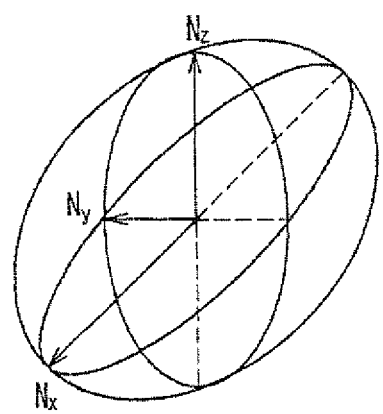
Figure 8:
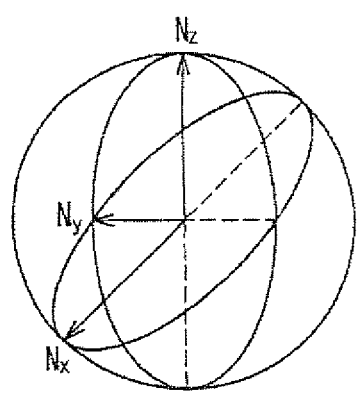

FIG. 8 (a) shows a refractive index ellipsoid of the liquid crystal molecules 21c of the liquid crystal cell 21, and $n_e > n_o$ is satisfied. FIG. 8 (b) shows a refractive index ellipsoid of the phase difference plate 24a, and $N_X > N_Z > N_Y$ is satisfied. FIG. 8 (c) shows, as a comparative example, a refractive index ellipsoid of a phase difference plate (negative A plate film) which has been conventionally used for wider viewing angle of a liquid crystal display device, and $N_X = N_Z > N_Y$ is satisfied.

Figure 9:
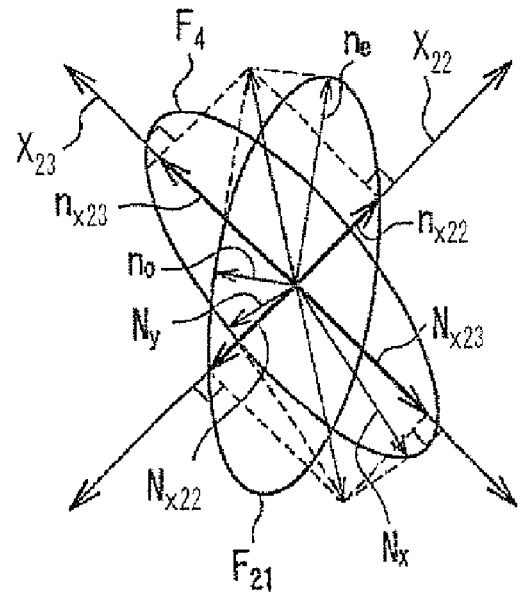
FIG. 9 (a) is a schematic view showing a relationship, in the viewing angle control panel shown in FIG. 7, between polarizing transmission axes, a refractive index ellipsoid of liquid crystal molecules and an refractive index ellipsoid of a phase difference plate when viewed from the vicinity of the azimuth θ=90°.
Figure 9:
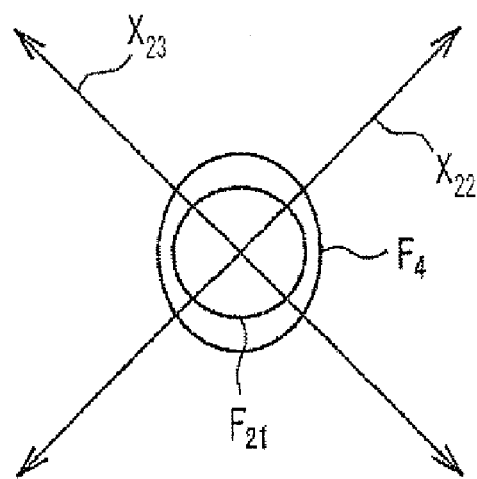

FIG. 9 (a) is a schematic view showing a relationship between the polarizing transmission axes $X_{22}$ and $X_{23}$ of the control panel upper polarizing plate 22 and the control panel lower polarizing plate 23, a refractive index ellipsoid $F_{21}$ of the liquid crystal molecules 21c, and a refractive index ellipsoid $F_4$ of the phase difference plate 24a when viewed from the vicinity of the viewpoint $P_2$ (azimuth θ=90°) shown in FIG. 3. In FIG. 9 (a), $n_e$ and $n_o$ of the refractive index ellipsoid $F_{21}$ of the liquid crystal molecules 21c are decomposed into a component $n_{x22}$ parallel to the polarizing transmission axis $X_{22}$ of the control panel upper polarizing plate 22 and a component $n_{x23}$ parallel to the polarizing transmission axis $X_{23}$ of the control panel upper polarizing plate 23. Further, $N_X$ and $N_Y$ of the refractive index ellipsoid $F_4$ of the phase difference plate 24a are decomposed into a component $N_{x22}$ parallel to the polarizing transmission axis $X_{22}$ of the control panel upper polarizing plate 22 and a component $N_{x23}$ parallel to the polarizing transmission axis $X_{23}$ of the control panel upper polarizing plate 23. As shown in FIG. 9 (a), $n_{x22}$ and $N_{x22}$ are equal in size, and $n_{x23}$ and $N_{x23}$ are equal in size. Therefore, as for the visual angle in the vicinity of the viewpoint $P_2$ (azimuth θ=90°) shown in FIG. 3, it is possible to prevent light leakage because a phase difference generated in the liquid crystal layer of the liquid crystal cell 21 is offset by the phase difference plate 24a. It should be noted that when viewed from the visual angle in the vicinity of the azimuth θ=270°, it is also possible to prevent light leakage on the basis of the same principle.

FIG. 9 (b) is a schematic view showing a relationship between the polarizing transmission axes $X_{22}$ and $X_{23}$ of the control panel upper polarizing plate 22 and the control panel lower polarizing plate 23, a refractive index ellipsoid $F_{21}$ of the liquid crystal molecules 21c, and a refractive index ellipsoid $F_4$ of the phase difference plate 24a when viewed from the vicinity of the viewpoint $P_1$ (azimuth θ=0°) shown in FIG. 3. As shown in FIG. 9 (b), when viewed from the visual angle in the vicinity of the azimuth θ=0°, a phase difference is hardly generated, and therefore light leakage is not caused.

With the above effect, it is possible to improve a narrow viewing angle characteristic in a narrow viewing angle mode by providing a phase difference plate between a polarizing plate and liquid crystal layer.

Further, in the viewing angle control panel 2 of the present invention, a white display portion in the wide viewing angle mode which is the first viewing angle has a retardation value Re1 of $nλ/2 - λ/4 < Re1 < nλ/2 + λ/4$, viewing angle control panel transmission light in a white display portion in the narrow viewing angle mode which is the second viewing angle has a retardation value Re2 of $nλ/2 - λ/4 < Re2 < nλ/2 + λ/4$, and viewing angle control panel transmission light in a black display portion in the narrow viewing angle mode has a retardation value Re 3 of $nλ - λ/4 < Re3 < nλ + λ/4$. It should be noted that n is an integer of 1 or more (n=1, 2, 3, . . . ), and n in Re1, Re2 and Re3 may be the same or may be different from each other.

In the present embodiment, the phase difference plates 24 and 25 are set so that the above-mentioned retardation values can be obtained. The "white display portion" means an area where light is not blocked and display can be seen, and the "black display portion" means an area where light is blocked and display cannot be seen. Further, the retardation value means a phase difference between individual components of light which passed through the phase difference plate. Further, the viewing angle control panel transmission light means light having the wavelength of 380 through 780 μm (visible light area) among light which passes through the viewing angle control panel.

Further, in order to obtain a better narrow viewing angle characteristic, it is preferable that the retardation value Re1, Re2 and Re3 are set to satisfy, respectively, $n\lambda/2-\lambda/8 < Re1 < n\lambda/2-\lambda/8$, $n\lambda/2-\lambda/8 < Re2 < n\lambda/2+\lambda/8$, and $n\lambda-\lambda/8 < Re3 < n\lambda+\lambda/8$, it is more preferable that Re1, Re2 and Re3 are set to be the nearest value to, respectively, integral multiple of $\lambda/2$, integral multiple of $\lambda/2$ and integral multiple of $\lambda$, and it is still more preferable that $Re1=n\lambda/2$, $Re2=n\lambda/2$ and $Re3=n\lambda$ are satisfied. It should be noted that n is an integer of 1 or more, and n in Re1, Re2 and Re3 may be the same or may be different from each other.

In the present invention, it is preferable that combinations of the plurality of phase difference plates having different refractive indexes are used. This makes it possible to form a viewing angle control panel having the above retardation value by using existing phase difference plates.

Figure 10:
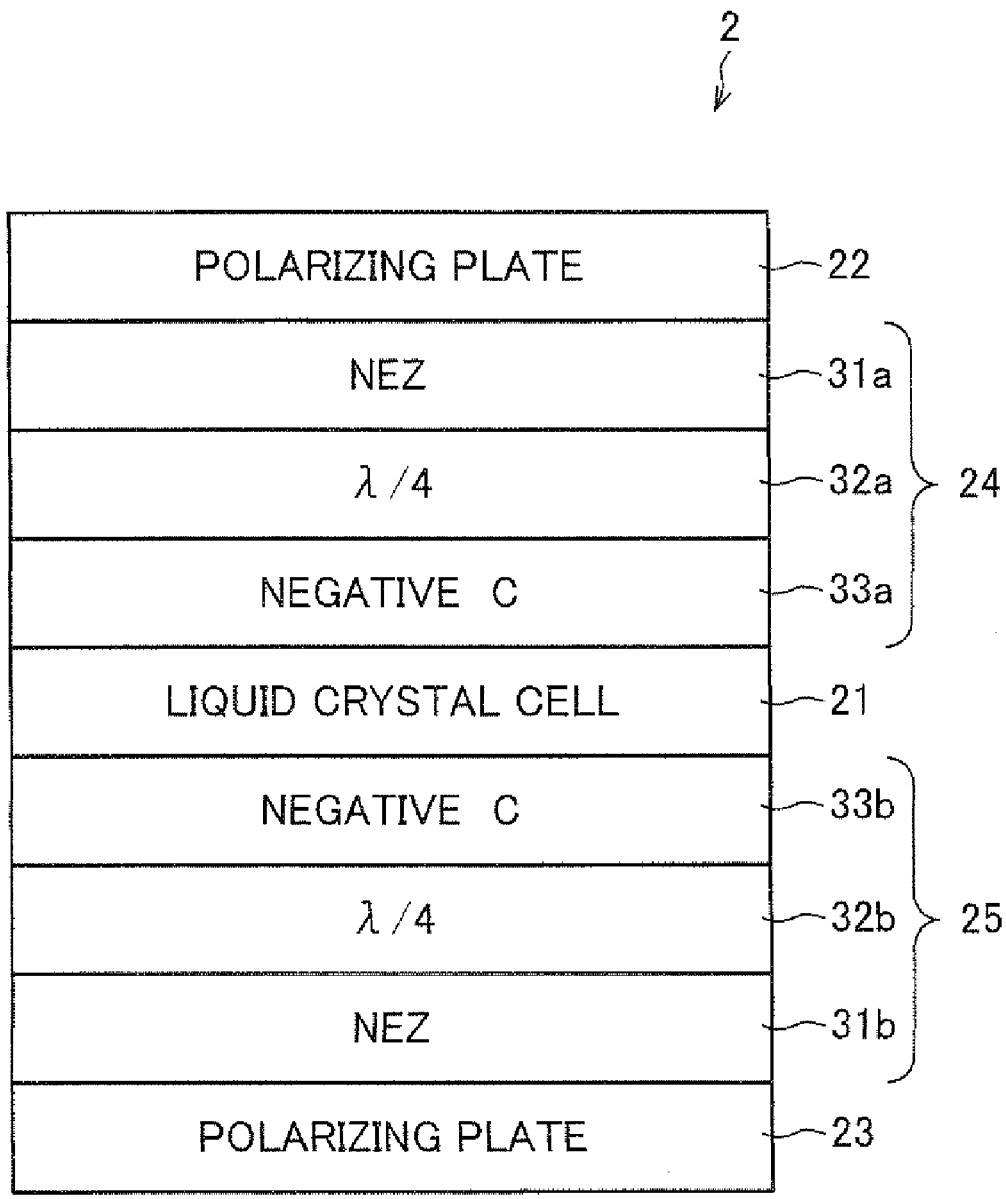
FIG. 10 is a cross-sectional view showing an arrangement of a viewing angle control panel of the liquid crystal display device shown in FIG. 1.

In the present embodiment, an example of an embodiment of a phase difference plate which satisfies the above condition is explained with reference to FIG. 10. FIG. 10 shows a more detailed arrangement of the viewing angle control panel 2 provided in the liquid crystal display device 10.

The viewing angle control panel 2 in the present embodiment has an arrangement in which the control panel lower polarizing plate 23, the lower phase difference plate 25, the liquid crystal cell 21, the upper phase difference plate 24 and the control panel upper polarizing plate 22 are stacked in this order. Further, as shown in FIG. 10, the phase difference plates (upper phase difference plate 24 and lower phase difference plate 25) include, as the upper phase difference plate 24 and the lower phase difference plate 25, negative C plates 33*a* and 33*b*, λ/4 plates 32*a* and 32*b*, and NEZ (trade name, see Non-Patent Document 1) 31*a* and 31*b* (two-axis phase difference plate), and have a structure in which the negative C plates 33*a* and 33*b*, the λ/4 plates 32*a* and 32*b*, and the NEZ 31*a* and 31*b* are stacked in this order from the liquid crystal cell 21 (liquid crystal layer) side.

Here, each of the phase difference plates constituting the phase difference plates 24 and 25 is explained. In the explanation of characteristics of the phase difference plates, each of the phase difference plates have the thickness d and three main refractive indexes nx, ny and nz in x, y and z-axis directions which x, y and z axis cross each other at right angles as shown in FIG. 11 (*a*).

Figure 11:
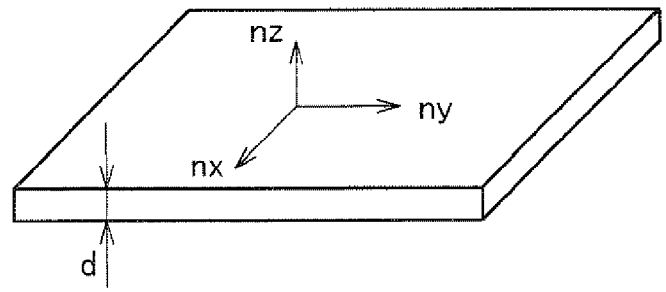
FIG. 11 (a) is a schematic view of a phase difference plate.
Figure 11:
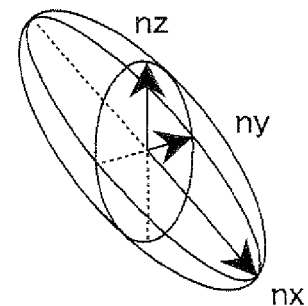
Figure 11:
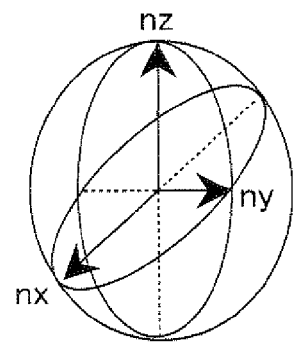
Figure 11:
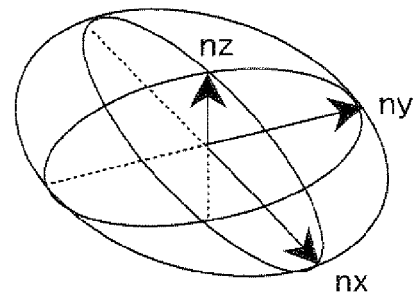

FIG. 11 (*b*) shows refractive index ellipsoids of the NEZ 31*a* and 31*b*, FIG. 11 (*c*) shows refractive index ellipsoids of the λ/4 plates 32*a* and 32*b*, and FIG. 11 (*d*) shows refractive index ellipsoids of the negative C plates (nega C) 33*a* and 33*b*. The NEZ satisfies nx>nz>ny, and is a two-axis phase difference plate having a relationship of (nx-nz)/|nx-ny|=0.1. The λ/4 plate satisfies nx>nz>ny, and the in-plane retardation value obtained by the equation |nx-ny|·d is λ/4 [nm] (380 nm≦λ≦780 nm). The negative C plate has a relationship of nx=ny>nz, and the retardation value obtained by the equation of |nx-nz|·d is generally 90 nm through 240 nm.

Further, examples of a phase difference plate which is not used in the upper phase difference plate 24 and the lower phase difference plate 25 of the present embodiment, but can be used in the present invention include a TAC film and a positive A plate. The TAC film has a relationship of nx=ny>nz, and the retardation value obtained by the equation of |nx-nz|·d is generally 50 nm through 60 nm. The positive A plate has a relationship of nx>ny=nz. Another example of the phase difference plate is a phase difference plate described in Non-Patent Document 1.

It should be noted that phase difference plates used for constituting a phase difference plate is not limited in particular, and it is possible to use various phase difference plates which are conventionally known, provided that the above-mentioned retardation values Re1, Re2 and Re3 can be obtained by combinations of the phase difference plates.

Further, an arrangement direction of each of the phase difference plates used in the viewing angle control panel 2 shown in FIG. 10 is explained. The NEZ 31*a* and the nega C 33*a* of the upper phase difference plate 24 and the nega C 33*b* of the lower phase difference plate 25 are arranged in a position where their x axes form the azimuth θ=135° (see FIG. 12) (direction where their x axes cross the polarizing transmission axis $X_{22}$ of the control panel upper polarizing plate 22 at right angles). The λ/4 plates 32*a* of the upper phase difference plate 24 and the λ/4 plates 32*b* of the lower phase difference plate 25 are arranged in a position where their x-axes form the azimuth θ=180° (see FIG. 12). The NEZ 31*b* of the lower phase difference plate 25 is arranged in a position where its x-axis form the azimuth θ=225° (see FIG. 12) (same direction as the polarizing transmission axis $X_{22}$ of the control panel upper polarizing plate 22).

The following explains a retardation value (Re value) of a wavelength detected at each viewpoint in the narrow viewing angle mode in the liquid crystal display device 10 including the viewing angle control panel 2 having an arrangement shown in FIG. 10.

Figure 12:
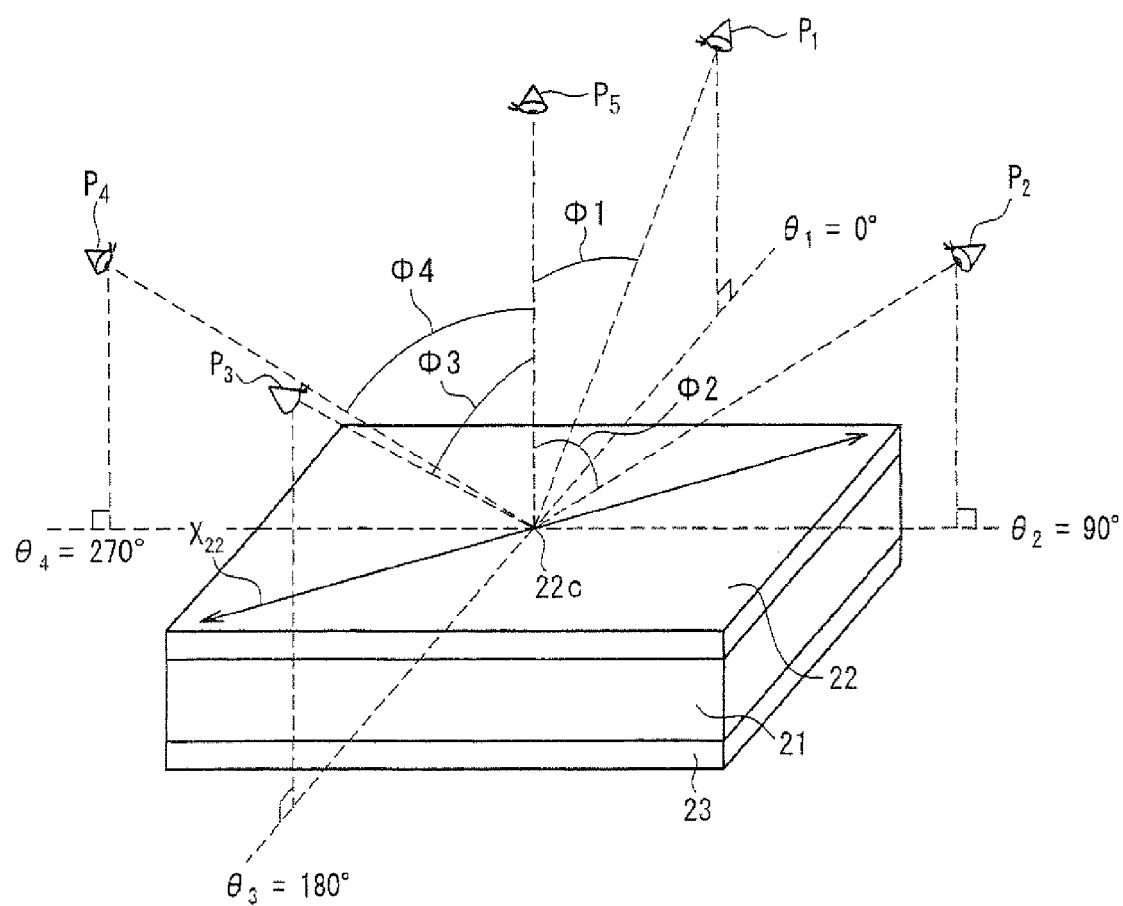
FIG. 12 is a schematic view showing a definition of a visual angle to the viewing angle control panel disposed in the same direction as in FIGS. 2 (a) and 2 (b), and explaining each viewpoint.

The viewpoints $P_1$ through $P_5$ to the viewing angle control panel 2 are explained first with reference to FIG. 12. As shown in FIG. 12, the azimuth θ is a rotation angle of a line linking (i) a foot of a perpendicular line drawn from a viewpoint to a plane including the surface of the control panel upper polarizing plate 22 and (ii) the center 22*c* of the control panel upper polarizing plate 22. In FIG. 12, the azimuth θ is set to be 0° in a direction of the viewpoint $P_1$ (first viewpoint), and increases clockwise when viewed from the upper side of the normal direction of the control panel upper polarizing plate 22. In FIG. 12, the azimuth $\theta_2$ of the viewpoint $P_2$ (second viewpoint) is 90°, the azimuth $\theta_3$ of the viewpoint $P_3$ (third viewpoint) is 180°, and the azimuth $\theta_4$ of the viewpoint $P_4$ (fourth viewpoint) is 270°. The polar angle Φ is an angle formed between a straight line drawn from the center 22*c* of the control panel upper polarizing plate 22 to the viewpoint and the normal of the control panel upper polarizing plate 22. It should be noted that all of $\Phi_1$ through $\Phi_4$ are set to be 45°. Further, the viewpoint $P_5$ (fifth viewpoint) is a viewpoint from the upper side of the normal direction of the control panel upper polarizing plate 22.

Figure 13:
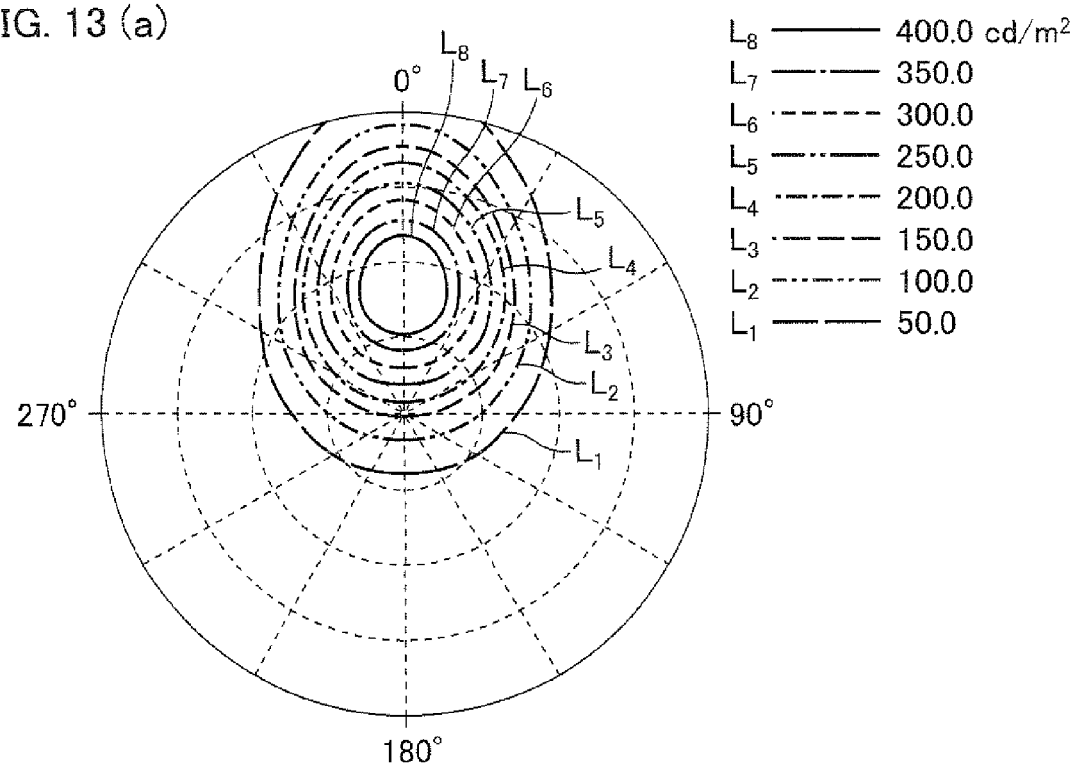
FIG. 13 (a) is a chart showing a luminance distribution of a liquid crystal display device including the viewing angle control panel shown in FIG. 10 in a narrow viewing angle mode.
Figure 13:
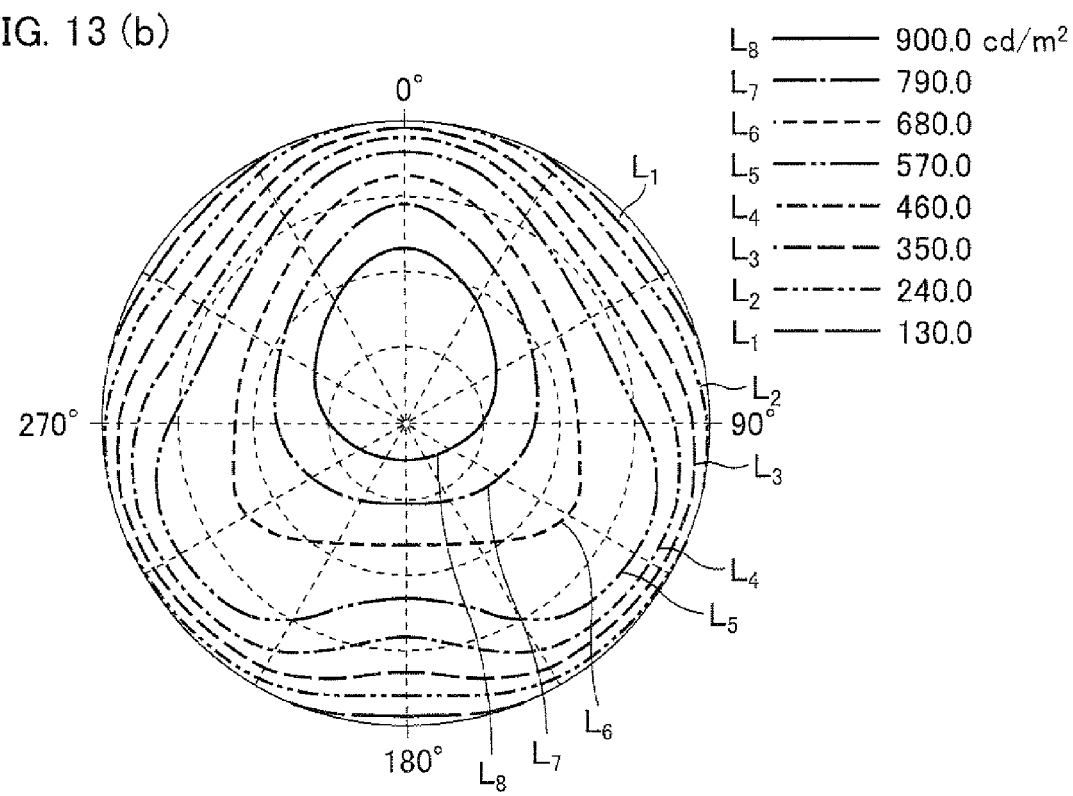

FIG. 13 (*a*) shows a luminance distribution of a liquid crystal display device including the viewing angle control panel shown in FIG. 10 in a narrow viewing angle mode. In FIG. 13 (*a*), $L_1$ through $L_8$ are equipotential lines showing distribution of visual angles having luminance of 50 cd/m², 100 cd/m², 150 cd/m², 200 cd/m², 250 cd/m², 300 cd/m², 350 cd/m² and 400 cd/m². Further, FIG. 13 (a) shows angles corresponding to the azimuth shown in FIG. 12.

At the viewpoints $P_1$ and $P_5$, the Re value becomes a value close to $\lambda/2$ (i.e. $\lambda/2-\lambda/4$ through $\lambda/2+\lambda/4$). In this case, as shown in FIG. 13 (a), the viewpoints $P_1$ and $P_5$ become the "white display portion" where display can be seen. At the viewpoints $P_2$, $P_3$ and $P_4$, the Re value becomes a value close to $\lambda$ (i.e. $\lambda-\lambda/4$ through $\lambda+\lambda/4$). In this case, as shown in FIG. 13 (a), the viewpoints $P_2$, $P_3$ and $P_4$ become the "black display portion" where display cannot be seen.

On the other hand, in the wide viewing angle mode, the liquid crystal molecules are arranged substantially vertically due to application of a voltage of 5.00V, and retardation is hardly caused in the liquid crystal cell 21. Therefore, in the viewing angle control panel 2 having the arrangement shown in FIG. 10, the Re value of the light which passed through the viewing angle control panel 2 is set to be near $\lambda/2$ only by the upper phase difference plate 24 and the lower phase difference plate 25 in the whole viewing angle in the wide viewing angle mode.

FIG. 13 (b) shows a luminance distribution of a liquid crystal display device including the viewing angle control panel shown in FIG. 10 in a wide viewing angle mode. In FIG. 13 (b), $L_1$ through $L_8$ are equipotential lines showing distribution of visual angles having luminance of 130 cd/m², 240 cd/m², 350 cd/m², 460 cd/m², 570 cd/m², 680 cd/m², 790 cd/m² and 900 cd/m². Further, FIG. 13 (b) shows angles corresponding to the azimuth shown in FIG. 12.

As shown in FIG. 13 (b), the liquid crystal panel has appropriate luminance in whole viewing angle (i.e. all of the viewpoints $P_1$ through $P_5$), and display can be seen from each of the viewpoints.

The retardation value can be set by selecting an area where display is blocked and an area where display can be seen in the narrow viewing angle mode and by performing simulation to find out the best combination of a liquid crystal layer, a phase difference plate and a polarizing plate.

When the luminance distribution shown in FIGS. 13 (a) and 13 (b) is obtained, the liquid crystal layer has the thickness d of 6.75 µm, and the type of liquid crystal is MS991032 (birefringent index $\Delta n=0.0615$). Further, in this case, the applied voltage is 2.95V in the narrow viewing angle mode and 5.00V in the wide viewing angle mode.

The thickness and birefringent index of the liquid crystal layer in the liquid crystal display device explained here is an example of the present invention, and the present invention is not limited to this. A liquid crystal layer generally used for viewing angle control can be used as the liquid crystal layer used in the viewing angle control panel of the present invention. However, in order to obtain the above-mentioned preferable retardation value, the liquid crystal layer preferably has birefringent index $\Delta n$ of 0.08 or less, and the thickness d of 5 µm or more and 7 µm or less. With this arrangement, a difference of retardation values between the narrow viewing angle mode and the wide viewing angle mode can be set to be more than $\lambda/2$. Therefore, optical compensation in an existing phase difference plate becomes easy, and it is possible to easily obtain the above-mentioned retardation value by combining a plurality of existing phase difference plates.

Figure 14:
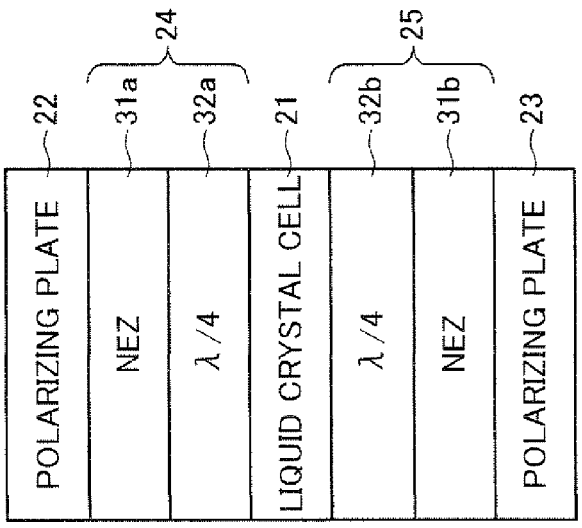
FIG. 14 (a) is a cross-sectional view showing another arrangement of a viewing angle control panel of the liquid crystal display device shown in FIG. 1.
Figure 14:
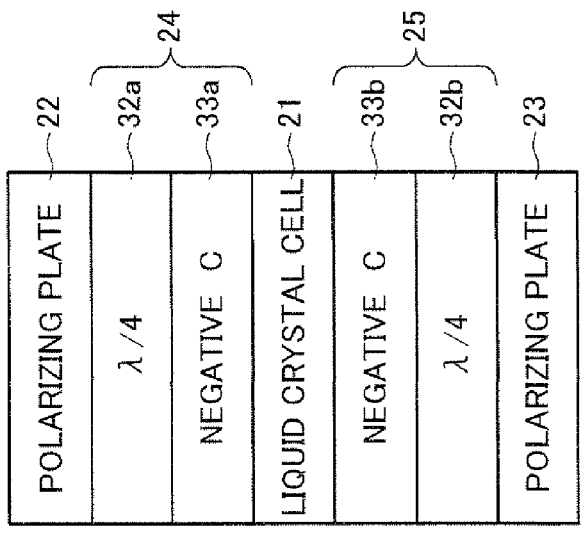
Figure 14:
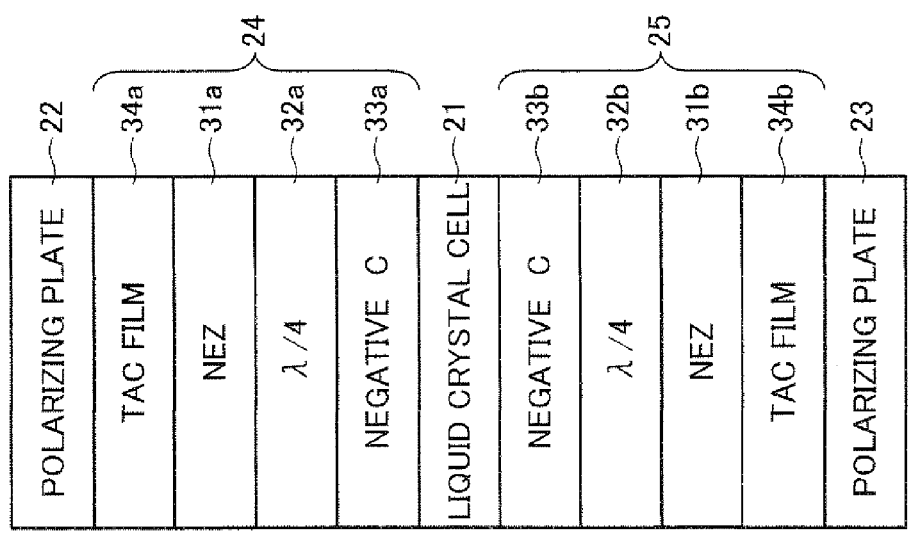

Explained here is an exemplary arrangement of the phase difference plates 24 and 25, and the present invention is not limited to this. FIGS. 14 (a) through 14 (c) show other examples of the viewing angle control panel of the liquid crystal display device of the present invention. Even when these viewing angle control panels are used, it is possible to obtain a viewing angle characteristic in which a visible area is more limited in the narrow viewing angle mode.

A viewing angle control panel 2a shown in FIG. 14 (a) is different from the viewing angle control panel 2 in that a TAC film 34a is provided between the control panel upper polarizing plate 22 and the NEZ 31a, and a TAC film 34b is provided between the control panel lower polarizing plate 23 and the NEZ 31b. A viewing angle control panel 2b shown in FIG. 14 (b) is different from the viewing angle control panel 2 in that the upper phase difference plate 24 has a structure in which the negative C plate 33a and the $\lambda/4$ plate 32a are stacked in this order from the liquid crystal cell 21 side, and the lower phase difference plate 25 has a structure in which the negative C plate 33b and the $\lambda/4$ plate 32b are stacked in this order from the liquid crystal cell 21 side. A viewing angle control panel 2c shown in FIG. 14 (c) is different from the viewing angle control panel 2 in that the upper phase difference plate 24 has a structure in which the $\lambda/4$ plate 32a and the NEZ 31a are stacked in this order from the liquid crystal cell 21 side, and the lower phase difference plate 25 has a structure in which the $\lambda/4$ plate 32b and the NEZ 31b are stacked in this order from the liquid crystal cell 21 side.

As described above, in order to obtain a viewing angle characteristic having the luminance distribution as shown in FIG. 13 (a) in the narrow viewing angle mode, it is preferable that the phase difference plate is selected from the group consisting of a NEZ, a $\lambda/4$ plate and a negative C plate, and the phase difference plate includes at least a $\lambda/4$ plate and a negative C plate.

Further, in the above arrangements, the phase difference plates (upper phase difference plate 24 and lower phase difference plate 25) are provided between the liquid crystal layer 21 and the two polarizing plates (control panel upper polarizing plate 22 and control panel lower polarizing plate 23), respectively. It should be noted that the present invention is not limited to this arrangement. However, in order to realize a state where it is possible to obtain a sufficient blocking effect at the viewpoints $P_2$, $P_3$ and $P_4$ shown in FIG. 12 in the narrow viewing angle mode (e.g. state where the luminance distribution as shown in FIG. 13 (a) can be obtained), it is preferable that two phase difference plates are provided between a liquid crystal layer and two polarizing plates, respectively.

Figure 15:
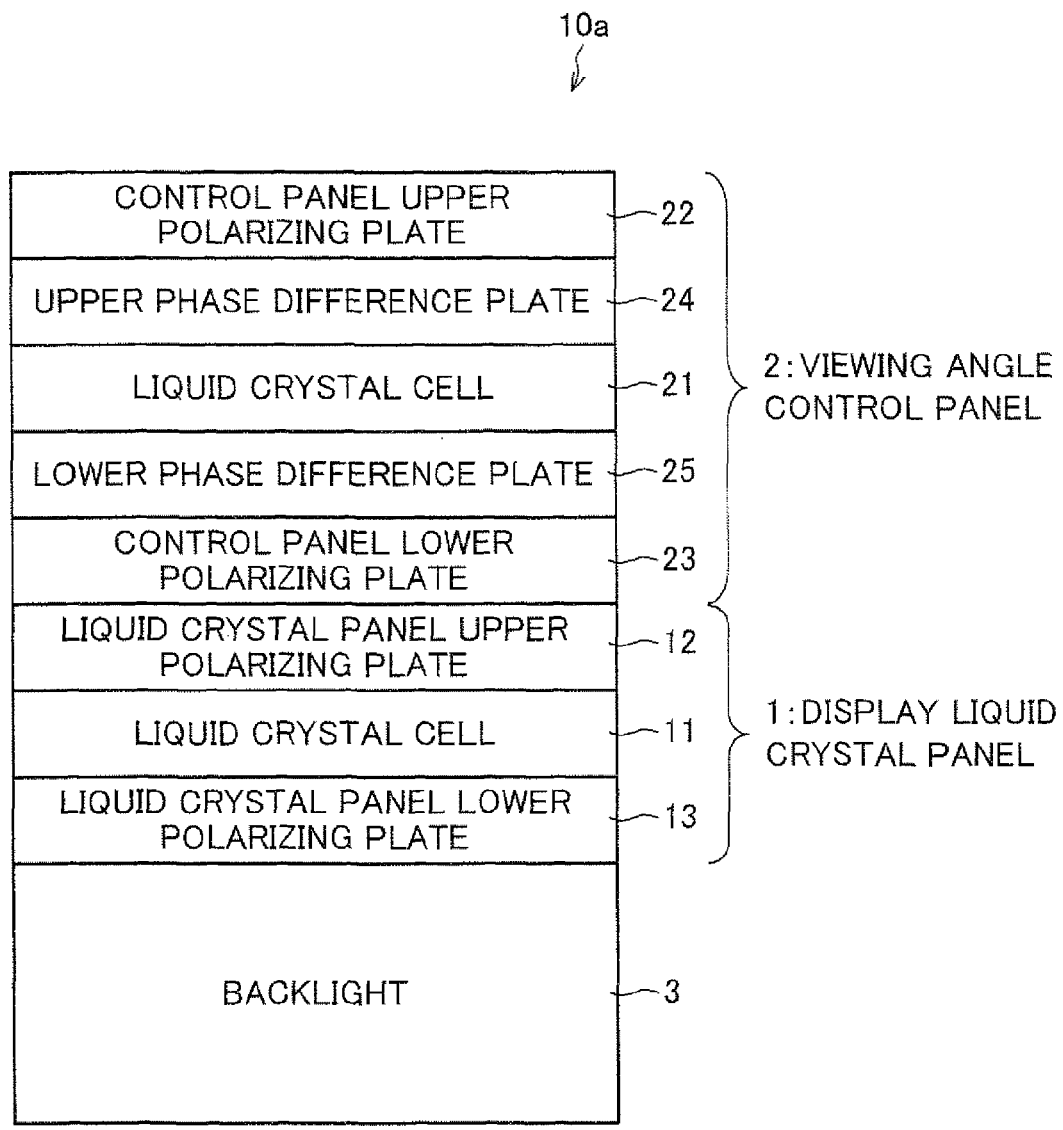
FIG. 15 shows a modification of the liquid crystal display device shown in FIG. 1 and is a cross-sectional view showing an arrangement of a liquid crystal display device including a display liquid crystal panel on a viewing angle control panel.
Figure 16:
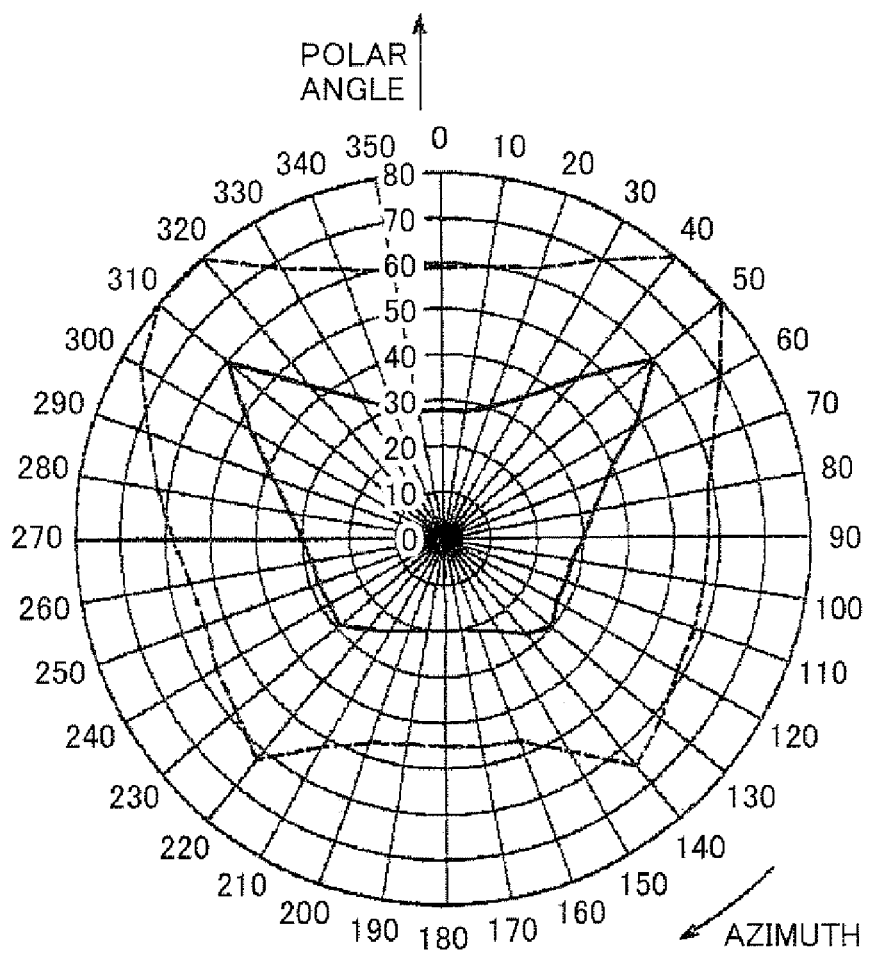
FIG. 16 is a chart showing a viewing angle distribution of a liquid crystal display device including a conventional viewing angle control panel.

As shown in FIG. 1, in the liquid crystal display device 10, the viewing angle control panel 2 is provided below the display liquid crystal panel 1. It should be noted that the present invention is not limited to this. A stacking order of the viewing angle control panel 2 and the display liquid crystal panel 1 may be reversed. That is, for example, as shown in FIG. 15, an arrangement of a liquid crystal display device 10a is possible in which the display liquid crystal panel 1 is stacked on the backlight 3 and the viewing angle control panel 2 is stacked on the display liquid crystal panel 1. Further, in this case, the display liquid crystal panel 1 may be a semi-transmissive liquid crystal panel.

Further, the homogeneous aligned positive type nematic liquid crystal is used in the liquid crystal layer of the viewing angle control panel explained in the present embodiment. It should be noted that the present invention is not limited to this, and negative type nematic liquid crystal may be used. When the negative type nematic liquid crystal is used, the behavior of the liquid crystal molecules is different from that of the positive type nematic liquid crystal. When a voltage is not applied, the liquid crystal molecules are arranged vertically to a substrate, and the liquid crystal molecules incline to a direction parallel to the substrate in accordance with an applied voltage. Therefore, it is necessary that in the wide viewing angle mode, a voltage is not applied to a liquid crystal cell of the viewing angle control panel, and in the narrow viewing angle mode, a predetermined voltage is applied to the liquid crystal cell of the viewing angle control panel.

The invention being thus described, it will be obvious that the same way may be varied in many ways. Such variations are not to be regarded as a departure from the main features of the invention. Therefore, the embodiments serve solely to illustrate examples of the present invention, which should not be narrowly interpreted. The scope of the present invention is shown in the scope of the following claims, and is not limited to the specification. Further, modifications and processes belonging to the equitable scope of claims are included in the scope of the present invention.

INDUSTRIAL APPLICABILITY

The present invention can be applied to a liquid crystal display device including a backlight, a display panel and a viewing angle control panel for controlling a viewing angle of the display panel. A liquid crystal display device of the present invention makes it possible to increase a blocking effect in a narrow viewing angle mode, and therefore can be applied to a display device in which protection of privacy and improvement of security are taken into consideration.

The invention claimed is:

1. A liquid crystal display device comprising a backlight, a liquid crystal display panel and a viewing angle control panel for switching a viewing angle of the liquid crystal display panel over between a first viewing angle and a second viewing angle which is within the first viewing angle and narrower than the first viewing angle, wherein:
the viewing angle control panel comprises a first polarizing plate, a liquid crystal layer and a second polarizing plate stacked in this order,
the viewing angle control panel comprises at least one phase difference plate at least one of between the first polarizing plate and the liquid crystal layer and between the second polarizing plate and the liquid crystal layer,
when the viewing angle of the liquid crystal display panel is the first viewing angle, the liquid crystal display panel has a retardation value Re1 of $n\lambda/2-\lambda/4<Re1<n\lambda/2+\lambda/4$ (n is an integer of 1 or more) at a white display portion,
when the viewing angle of the liquid crystal display panel is the second viewing angle, the liquid crystal display panel has a retardation value Re2 of $n\lambda/2-\lambda/4<Re2<n\lambda/2+\lambda/4$ (n is an integer of 1 or more) at a white display portion, and
when the viewing angle of the liquid crystal display panel is the second viewing angle, the liquid crystal display panel has a retardation value Re3 of $n\lambda-\lambda/4<Re3<n\lambda+\lambda/4$ (n is an integer of 1 or more) at a black display portion.

2. The liquid crystal display device according to claim 1, wherein
the retardation value Re1 is $n\lambda/2$ (n is an integer of 1 or more), the retardation value Re2 is $n\lambda/2$ (n is an integer of 1 or more), and the retardation value Re3 is $n\lambda$ (n is an integer of 1 or more).

3. The liquid crystal display device according to claim 1, wherein
in the second viewing angle, retardation values at a first viewpoint and a fifth viewpoint are $n\lambda/2-/4$ through $n\lambda/2+\lambda/4$ (n is an integer of 1 or more), and retardation values at a second viewpoint, a third viewpoint and a fourth viewpoint are $n\lambda-\lambda/4$ through $n\lambda+\lambda/4$ (n is an integer of 1 or more),
where the second viewpoint is a viewpoint which satisfies $\theta=90°$ and $\Phi=45°$, the third viewpoint is a viewpoint which satisfies $\theta=180°$ and $\Phi=45°$, the fourth viewpoint is a viewpoint which satisfies $\theta=270°$ and $\Phi=45°$, and the fifth viewpoint is a viewpoint from a direction of $\Phi=0°$, and where a polar angle $\Phi$ is an angle formed between a straight line drawn from a center of a surface of the viewing angle control panel to a viewpoint and a normal at the center of the surface of the viewing angle control panel, a first viewpoint is a viewpoint which satisfies $\Phi=45°$, and an azimuth $\theta$ is a rotation angle from a line drawn between a foot of a perpendicular line drawn from the first viewpoint to a plane including the surface of the viewing angle control panel and the center of the surface of the viewing angle control panel.

4. The liquid crystal display device according to claim 1, wherein
the phase difference plate is provided at each of between the first polarizing plate and the liquid crystal layer and between the second polarizing plate and the liquid crystal layer.

5. The liquid crystal display device according to claim 1, wherein
the plurality of phase difference plates are stacked and provided at least one of between the first polarizing plate and the liquid crystal layer and between the second polarizing plate and the liquid crystal layer, and the phase difference plates stacked on each other have different refractive indexes.

6. The liquid crystal display device according to claim 5, wherein
the phase difference plate is selected from the group consisting of a $\lambda/4$ plate, a negative C plate, and a two-axis phase difference plate having three main refractive indexes nx, ny and nz in x-axis, and z-axis directions, the x-axis, y-axis and z-axis crossing each other at right angles, and the refractive indexes nx, ny and nz satisfying $nx>nz>ny$ and $(nx-nz)/|nx-ny|=0.1$.

7. The liquid crystal display device according to claim 5, comprising:
at least a $\lambda/4$ plate and a negative C plate as the phase difference plates, at least one of between the first polarizing plate and the liquid crystal layer and between the second polarizing plate and the liquid crystal layer.

8. The liquid crystal display device according to claim 6 comprising: as the phase difference plate, the negative C plate, the $\lambda/4$ plate and the two-axis phase difference plate, and at least one of between the first polarizing plate and the liquid crystal layer, and between the second polarizing plate and the liquid crystal layer, the negative C plate, the $\lambda/4$ plate and the two-axis phase difference plate are stacked in this order from the liquid crystal layer side.

9. The liquid crystal display device according to claim 1, wherein
polarizing transmission axes of the first polarizing plate and the second polarizing plate constituting the viewing angle control panel cross each other at right angles.

10. A viewing angle control panel (i) disposed on at least one of a back surface and a front surface of a display device for displaying an image and (ii) configured to switch a viewing angle of the display device over between a first viewing angle and a second viewing angle which is within the first viewing angle and narrower than the first viewing angle, wherein:
the viewing angle control panel comprises a first polarizing plate, a liquid crystal layer and a second polarizing plate stacked in this order,
the viewing angle control panel comprises at least one phase difference plate at least one of between the first polarizing plate and the liquid crystal layer and between the second polarizing plate and the liquid crystal layer, when the viewing angle of the display device is the first viewing angle, the display device has a retardation value $Re1$ of $n\lambda/2-\lambda/4 < Re1 < n\lambda/2+\lambda/4$ (n is an integer of 1 or more) at a white display portion, when the viewing angle of the display device is the second viewing angle, the display device has a retardation value $Re2$ of $n\lambda/2-\lambda/4 < Re2 < n\lambda/2+\lambda/4$ (n is an integer of 1 or more) at a white display portion, and when the viewing angle of the display device is the second viewing angle, the liquid crystal display panel has a retardation value $Re3$ of $n\lambda-\lambda/4 < Re3 < n\lambda+\lambda/4$ (n is an integer of 1 or more) at a black display portion.

11. The viewing angle control panel according to claim 10, wherein the retardation value $Re1$ is $n\lambda/2$ (n is an integer of 1 or more), the retardation value $Re2$ is $n\lambda/2$ (n is an integer of 1 or more), and the retardation value $Re3$ is $n\lambda$ (n is an integer of 1 or more).

12. The viewing angle control panel according to claim 10, wherein in the second viewing angle, retardation values at a first viewpoint and a fifth viewpoint are $n\lambda/2-\lambda/4$ through $n\lambda/2+\lambda/4$ (n is an integer of 1 or more), and retardation values at a second viewpoint, a third viewpoint and a fourth viewpoint are $n\lambda-\lambda/4$ through $n\lambda+\lambda/4$ (n is an integer of 1 or more), where the second viewpoint is a viewpoint which satisfies $\theta=90°$ and $\Phi=45°$, the third viewpoint is a viewpoint which satisfies $\theta=180°$ and $\Phi=45°$, the fourth viewpoint is a viewpoint which satisfies $\theta=270°$ and $\theta=45°$, and the fifth viewpoint is a viewpoint from a direction of $\Phi=0°$, and where a polar angle $\Phi$ is an angle formed between a straight line drawn from a center of a surface of the viewing angle control panel to a viewpoint and a normal at the center of the surface of the viewing angle control panel, a first viewpoint is a viewpoint which satisfies $\Phi=45°$, and an azimuth $\theta$ s a rotation angle from a line drawn between a foot of a perpendicular line drawn from the first viewpoint to a plane including the surface of the viewing angle control panel and the center of the surface of the viewing angle control panel.

* * * * *